United States Patent
Gu et al.

(10) Patent No.: US 8,570,261 B2
(45) Date of Patent: Oct. 29, 2013

(54) UNDULATING ELECTRODES FOR IMPROVED VIEWING ANGLE AND COLOR SHIFT

(75) Inventors: Mingxia Gu, Santa Clara, CA (US); Ming Xu, Cupertino, CA (US); Cheng Chen, Cupertino, CA (US); John Z. Zhong, Cupertino, CA (US); Shih Chang Chang, Cupertino, CA (US); Shawn Robert Gettemy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/620,230

(22) Filed: Sep. 14, 2012

(65) Prior Publication Data
US 2013/0021567 A1    Jan. 24, 2013

Related U.S. Application Data

(63) Continuation of application No. 12/371,360, filed on Feb. 13, 2009, now abandoned.

(51) Int. Cl.
*G02F 1/133* (2006.01)

(52) U.S. Cl.
USPC ............ 345/87; 349/110; 349/141; 349/142

(58) Field of Classification Search
None
See application file for complete search history.

(56) References Cited

U.S. PATENT DOCUMENTS

| 6,538,713 B1 * | 3/2003 | Yanagawa et al. ............ 349/141 |
| 2005/0105033 A1 * | 5/2005 | Itou et al. ...................... 349/141 |
| 2006/0256264 A1 * | 11/2006 | Yang et al. .................... 349/114 |

* cited by examiner

*Primary Examiner* — Joseph Haley
(74) *Attorney, Agent, or Firm* — Fletcher Yoder PC

(57) ABSTRACT

The present disclosure generally provides for a variety of multi-domain pixel configurations that may be implemented in the unit pixels of an LCD display device, such as a fringe field switching LCD display panel. An LCD display device utilizing one or more of the presently disclosed techniques disclosed herein may exhibit improved display properties, such as viewing angle, color shift, and transmittance properties, relative to those exhibited by conventional multi-domain designs.

20 Claims, 13 Drawing Sheets

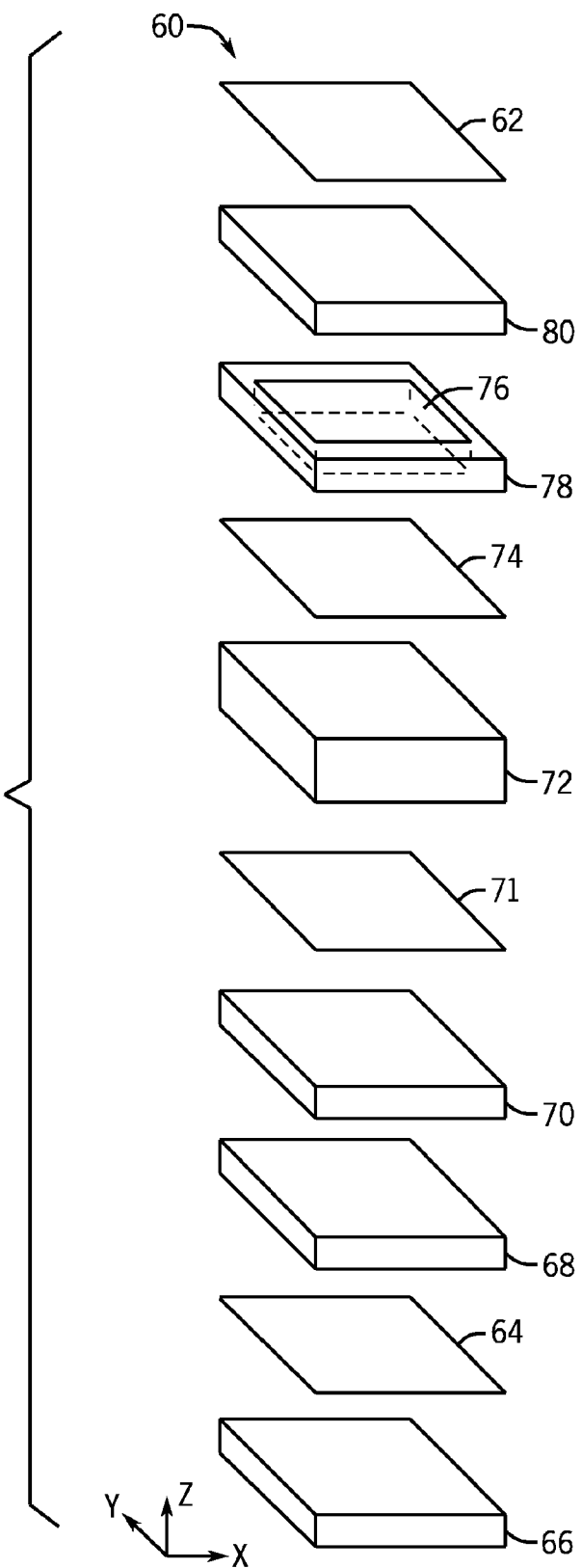

UNDULATING ELECTRODES FOR IMPROVED VIEWING ANGLE AND COLOR SHIFT

CROSS REFERENCE TO RELATED APPLICATIONS

The present application is a continuation of U.S. patent application Ser. No. 12/371,360, entitled "Undulating Electrodes for Improved Viewing Angle and Color Shift", filed Feb. 13, 2009, which is herein incorporated by reference.

BACKGROUND

1. Technical Field

Embodiments of the present disclosure relate generally to display devices and, more particularly, to liquid crystal display (LCD) devices.

2. Description of the Related Art

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery powered devices or in other contexts were it is desirable to minimize power usage. LCD devices typically include a plurality of unit pixels arranged in a matrix. The unit pixels may be driven by scanning line and data line circuitry to display an image that may be perceived by a user.

Conventional unit pixels of fringe-field switching (FFS) LCD display panels may utilize multi-domain or single-domain configurations and may typically include strip-shaped or finger-shaped pixel electrodes. The pixel electrodes are generally controlled by transistors to create electrical fields that allow at least a portion of a light source to pass through a liquid crystal material within the pixels. In conventional single-domain pixel configurations, pixel electrodes are generally arranged parallel to one another such that all the pixel electrodes within the LCD panel are oriented in the same direction. This generally results in the electrical fields generated within a single-domain unit pixel being in the same direction throughout the unit pixel, thereby providing a higher light transmittance rate compared to that of multi-domain pixel configurations. However, conventional single-domain pixel configurations generally offer poorer viewing angles and color shift properties compared to multi-domain configurations.

In conventional multi-domain pixel configurations, pixel electrodes within each unit pixel may be oriented in more than one direction. In this manner, the overall viewing angle and color shift properties of the LCD panel may be improved. However, disclinations may result in light-transmissive portions of multi-domain unit pixels due to the differing directions of electrical fields generated within each unit pixel. Such disinclinations are particularly problematic in that they may block a portion of the light transmitted through the pixels, thus reducing the overall transmittance rate of the LCD panel.

SUMMARY

Certain aspects of embodiments disclosed herein by way of example are summarized below. It should be understood that these aspects are presented merely to provide the reader with a brief summary of certain forms the various techniques disclosed and/or claimed herein might take and that these aspects are not intended to limit the scope of any technique disclosed and/or claimed herein. Indeed, any technique disclosed and/or claimed herein may encompass a variety of aspects that may not be set forth below.

The present disclosure generally provides for a variety of pixel configurations that may be implemented in the unit pixels of an LCD display device, such as a fringe field switching LCD display panel, to provide for display properties (e.g., viewing angle, color shift, and transmittance) that are generally improved relative to those exhibited by conventional multi-domain designs. In one embodiment, an LCD panel may include unit pixels having undulating electrodes generally defining a wave-like shape along a vertical axis of the LCD panel. In such an embodiment, the LCD panel may also include wave-like data lines, as well as a light-opaque matrix defining light-transmissive apertures over each unit pixel, such that the data lines and the vertical edges of the apertures generally mimic the wake-like shape defined by the undulating electrodes in a parallel manner. In another embodiment, an LCD panel may include unit pixels having electrodes, wherein the electrodes each include two or more electrode strips oriented along the vertical length of the electrode, such that the electrode strips diverge from a first end of the electrode and converge at a second end that is opposite the first end.

In a further embodiment, an LCD panel may exhibit reduced off-axis color shift relative to conventional multi-domain designs by utilizing pixels having electrodes that include electrode strips angled in a first direction along a first distance of the vertical length of the electrode and angled in a second direction along a second distance of the vertical length of the electrode, such that the orientation of the electrode for each pixel is asymmetric with respect to the vertical and horizontal axes of the LCD panel. In yet a further embodiment, an LCD panel may exhibit increased aperture ratio and, therefore, enhanced brightness, by utilizing pixels having electrodes that include first and second sets of electrode strips extending from opposing vertical edges of the electrode, such that the first and second sets of electrode strips are generally parallel with each other and arranged in an interleaving manner. As will be discussed in further detail below, the various techniques disclosed herein may provide for improvements with regard to viewing angle, color shift, and transmittance properties of display panels relative to those of conventional multi-domain pixel designs.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

DESCRIPTION OF THE DRAWINGS

These and other features, aspects, and advantages of the present disclosure will become better understood when the following detailed description of certain exemplary embodiments is read with reference to the accompanying drawings in which like characters represent like parts throughout the drawings, wherein:

FIG. 4 is an exploded view of exemplary layers of a unit pixel of an LCD display panel, in accordance with aspects of the present disclosure;

DETAILED DESCRIPTION OF SPECIFIC EMBODIMENTS

One or more specific embodiments of the present disclosure will be described below. These described embodiments are only exemplary of the presently disclosed techniques. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
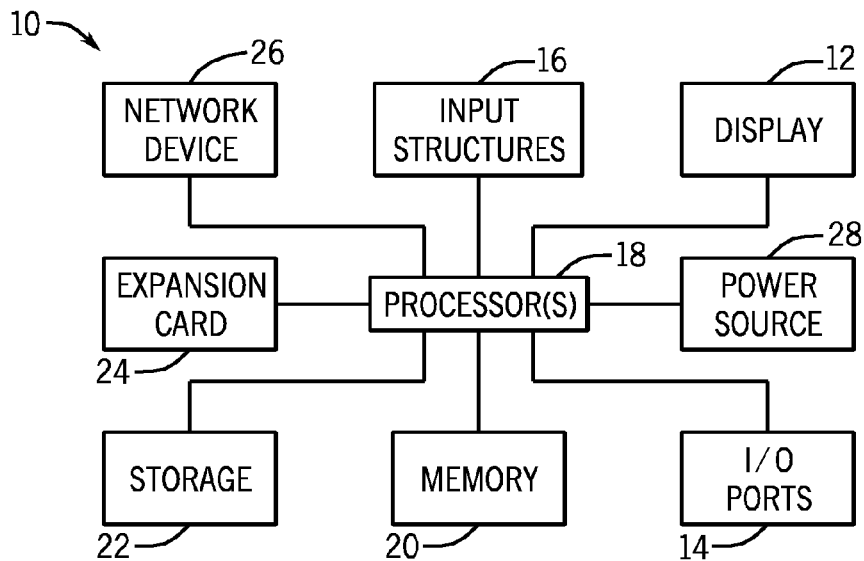
FIG. 1 is a block diagram depicting exemplary components of an electronic device, in accordance with aspects of the present disclosure.
Figure 3:
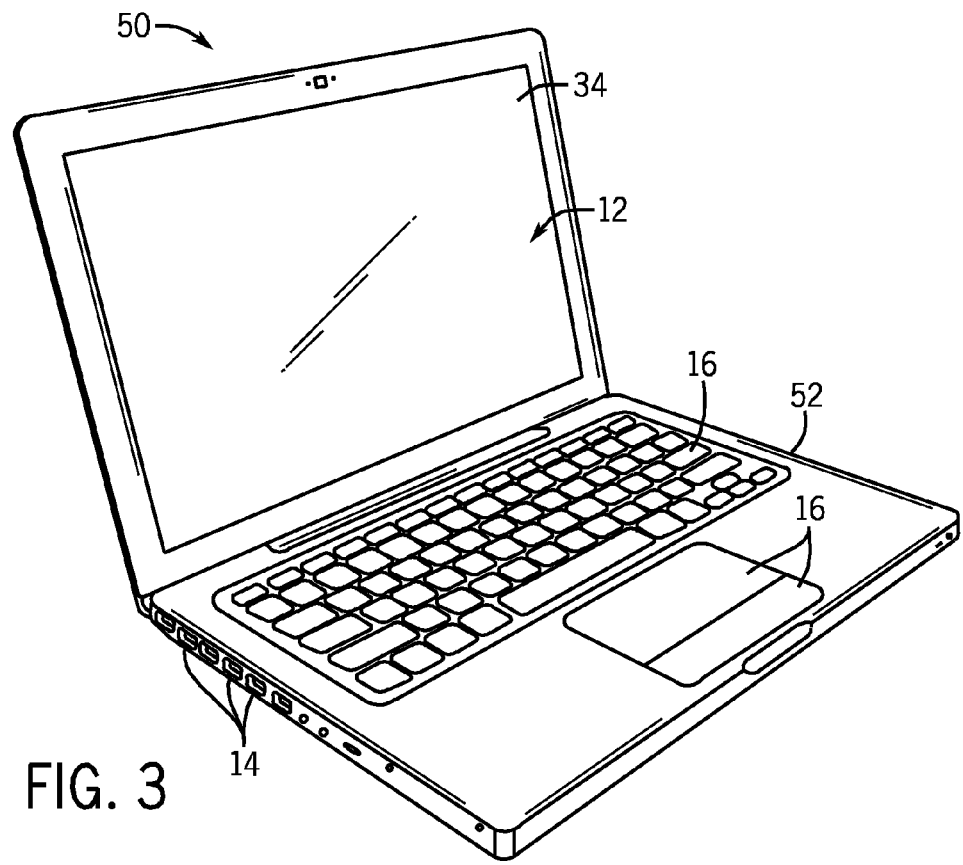
FIG. 3 is a view of a computer, in accordance with aspects of the present disclosure.
Figure 2:
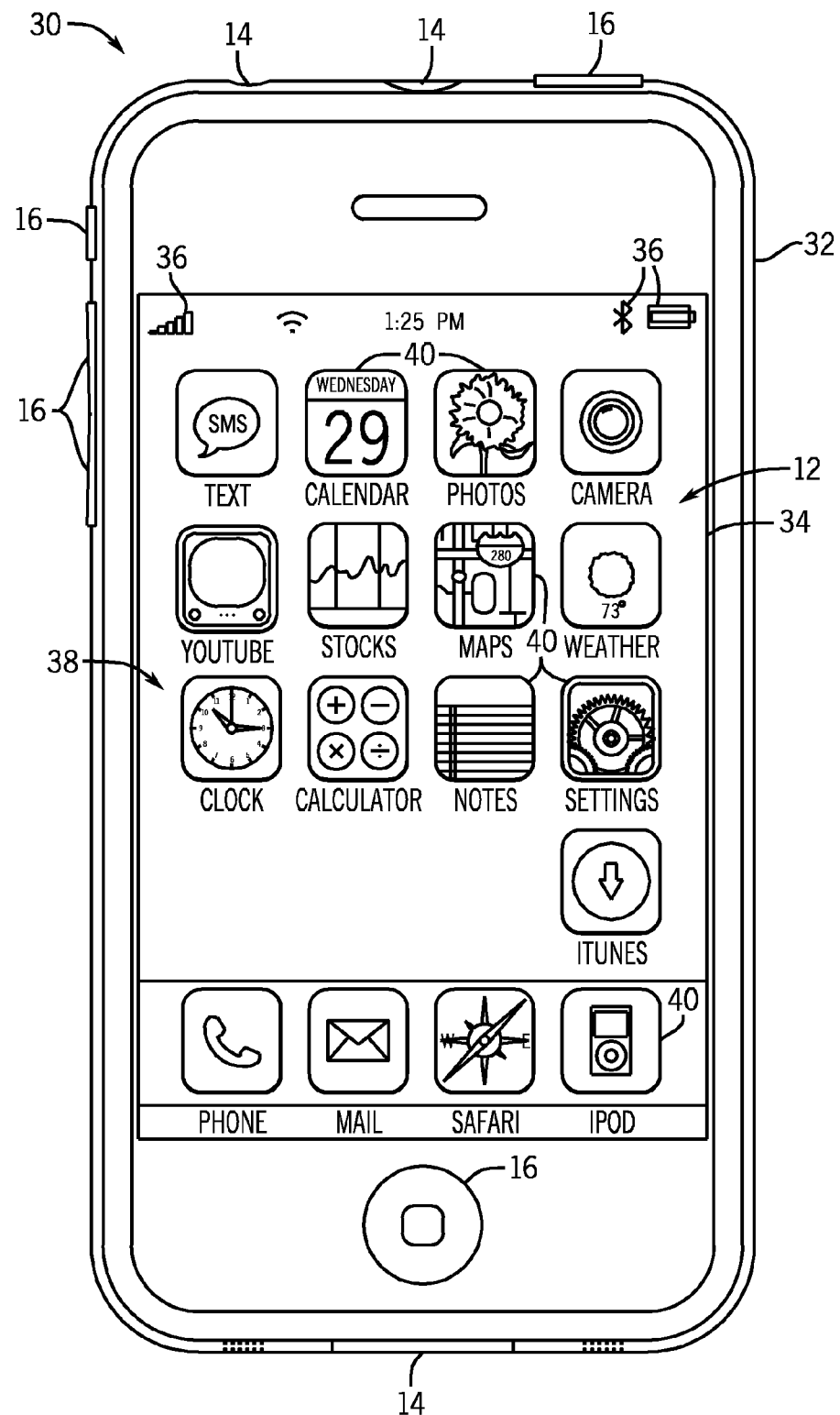
FIG. 2 is a front view of a handheld electronic device, in accordance with aspects of the present disclosure.

With these foregoing features in mind, a general description of suitable electronic devices using LCD displays that may implement pseudo multi-domain properties in accordance with aspects of the present disclosure is provided below. In FIG. 1, a block diagram depicting various components that may be present in electronic devices suitable for use with the present techniques is provided. In FIG. 2, one example of a suitable electronic device, provided here as a handheld electronic device, is depicted. In FIG. 3, another example of a suitable electronic device, provided here as a computer system, is depicted. These types of electronic devices, and other electronic devices providing comparable display capabilities, may be used in conjunction with the present techniques.

An example of a suitable electronic device may include various internal and/or external components which contribute to the function of the device. FIG. 1 is a block diagram illustrating the components that may be present in such an electronic device 10 and which may allow the device 10 to function in accordance with the techniques discussed herein. Those of ordinary skill in the art will appreciate that the various functional blocks shown in FIG. 1 may comprise hardware elements (including circuitry), software elements (including computer code stored on a computer-readable medium) or a combination of both hardware and software elements. It should further be noted that FIG. 1 is merely one example of a particular implementation and is merely intended to illustrate the types of components that may be present in a device 10. For example, in the presently illustrated embodiment, these components may include a display 12, I/O ports 14, input structures 16, one or more processors 18, a memory device 20, a non-volatile storage 22, expansion card(s) 24, a networking device 26, and a power source 28.

With regard to each of these components, the display 12 may be used to display various images generated by the device 10. In one embodiment, the display 12 may be a liquid crystal displays (LCD). For example, the display 12 may be an LCD employing fringe field switching (FFS), in-plane switching (IPS), or other techniques useful in operating such LCD devices. Additionally, in certain embodiments of the electronic device 10, the display 12 may be provided in conjunction with a touch-sensitive element, such as a touchscreen, that may be used as part of the control interface for the device 10.

The I/O ports 14 may include ports configured to connect to a variety of external devices, such as a power source, headset or headphones, or other electronic devices (such as handheld devices and/or computers, printers, projectors, external displays, modems, docking stations, and so forth). The I/O ports 14 may support any interface type, such as a universal serial bus (USB) port, a video port, a serial connection port, an IEEE-1394 port, an Ethernet or modem port, and/or an AC/DC power connection port.

The input structures 16 may include the various devices, circuitry, and pathways by which user input or feedback is provided to the processor 18. Such input structures 16 may be configured to control a function of the device 10, applications running on the device 10, and/or any interfaces or devices connected to or used by the electronic device 10. For example, the input structures 16 may allow a user to navigate a displayed user interface or application interface. Examples of the input structures 16 may include buttons, sliders, switches, control pads, keys, knobs, scroll wheels, keyboards, mice, touchpads, and so forth.

In certain embodiments, an input structure 16 and display 12 may be provided together, such an in the case of a touchscreen where a touch-sensitive mechanism is provided in conjunction with the display 12. In such embodiments, the user may select or interact with displayed interface elements via the touch-sensitive mechanism. In this way, the displayed interface may provide interactive functionality, allowing a user to navigate the displayed interface by touching the display 12. For example, user interaction with the input structures 16, such as to interact with a user or application interface displayed on the display 12, may generate electrical signals indicative of the user input. These input signals may be routed via suitable pathways, such as an input hub or data bus, to the one or more processor 18 for further processing.

In addition to processing various input signals received via the input structure(s) 16, the processor(s) 18 may control the general operation of the device 10. For instance, the processor(s) 18 may provide the processing capability to execute an operating system, programs, user and application interfaces, and any other functions of the electronic device 10. The processor(s) 18 may include one or more microprocessors, such as one or more "general-purpose" microprocessors, one or more special-purpose microprocessors and/or application-specific microprocessors (ASICs), or some combination of such processing components. For example, the processor 18 may include one or more instruction set (RISC) processors, as well as graphics processors, video processors, audio processors and/or related chip sets. As will be appreciated, the processor(s) 18 may be coupled to one or more data buses for transferring data and instructions between various components of the device 10.

The instructions or data to be processed by the processor(s) 18 may be stored in a computer-readable medium, such as a memory 20. Such a memory 20 may be provided as a volatile memory, such as random access memory (RAM) or as a non-volatile memory, such as read-only memory (ROM), or as a combination of one or more RAM and ROM devices. The memory 20 may store a variety of information and may be used for various purposes. For example, the memory 20 may store firmware for the electronic device 10, such as a basic input/output system (BIOS), an operating system, various programs, applications, or any other routines that may be executed on the electronic device 10, including user interface functions, processor functions, and so forth. In addition, the memory 20 may be used for buffering or caching during operation of the electronic device 10.

In addition to the memory 20, the device 10 may further include a non-volatile storage 22 for persistent storage of data and/or instructions. The non-volatile storage 22 may include flash memory, a hard drive, or any other optical, magnetic, and/or solid-state storage media, or some combination thereof. The non-volatile storage 22 may be used to store data files such as firmware, data files, software programs and applications, wireless connection information, personal information, user preferences, and any other suitable data.

The embodiment illustrated in FIG. 1 may also include one or more card or expansion slots. The card slots may be configured to receive an expansion card 24 that may be used to add functionality, such as additional memory, I/O functionality, or networking capability, to the electronic device 10. Such an expansion card 24 may connect to the device through any type of suitable connector, and may be accessed internally or external with respect to a housing of the electronic device 10. For example, in one embodiment, the expansion card 24 may be flash memory card, such as a SecureDigital (SD) card, mini- or microSD, CompactFlash card, Multimedia card (MMC), or the like. Additionally, the expansion card 24 may be a Subscriber Identity Module (SIM) card, for use with an embodiment of the electronic device 10 that provides mobile phone capability.

The components depicted in FIG. 1 also include a network device 26, such as a network controller or a network interface card (NIC). In one embodiment, the network device 26 may be a wireless NIC providing wireless connectivity over any 802.11 standard or any other suitable wireless networking standard. The network device 26 may allow the electronic device 10 to communicate over a network, such as a Local Area Network (LAN), Wide Area Network (WAN), such as an Enhanced Data Rates for GSM Evolution (EDGE) network for a 3G data network (e.g., based on the IMT-2000 standard), or the Internet. Additionally, the network device 26 may provide for connectivity to a personal area network, such as a Bluetooth® network, an IEEE 802.15.4 (e.g., ZigBee) network, or an ultra wideband network (UWB). In some embodiments, the network device 26 may further provide for close-range communications using a near-field communication (NFC) interface operating in accordance with one or more standards, such as ISO 18092, ISO 21481, or the TransferJet® protocol.

As will be understood, the device 10 may use the network device 26 to connect to and send or receive data with any device on a common network, such as portable electronic devices, personal computers, printers, and so forth. Alternatively, in some embodiments, the electronic device 10 may not include a network device 26. In such an embodiment, a NIC may be added as an expansion card 24 to provide similar networking capability as described above.

Further, the components may also include a power source 28. In one embodiment, the power source 28 may be provided as one or more batteries, such as a lithium-ion polymer battery. The battery may be user-removable or may be secured within the housing of the electronic device 10, and may be rechargeable. Additionally, the power source 28 may include AC power, such as provided by an electrical outlet, and the electronic device 10 may be connected to the power source 28 via a power adapter, which may also be used to recharge one or more batteries if present.

With the foregoing in mind, FIG. 2 illustrates an electronic device 10 in the form of a portable handheld device 30, provided here as a cellular telephone. It should be understood that while the illustrated device 30 is generally described in the context of a cellular phone, other types of handheld devices may be provided as the handheld device 30, such as a digital media player for playing music and/or video, a personal data organizer, a gaming platform, to name just a few. Further, various embodiments of the handheld device 30 may incorporate the functionalities of one or more types of devices, such as a cellular phone function, a digital media player, a camera, a portable gaming platform, a personal data organizer, or some combination thereof. Thus, depending on the functionalities provided by the handheld electronic device 30, a user may listen to music, play video games, take pictures, and place telephone calls, while moving freely with the device 30.

As discussed above with respect to the electronic device 10 shown in FIG. 1, the handheld device 30 may allow a user to connect to and communicate (e.g., using the network device 26) through the Internet or through other networks, such as local or wide area networks. For example, the handheld device 30 may allow a user to communicate using e-mail, text messaging, instant messaging, or other forms of electronic communication. In certain embodiments, the handheld device 30 also may communicate with other devices using short-range connection protocols, such as Bluetooth and near field communication (NFC). By way of example only, the handheld device 30 may be a model of an iPod® or an iPhone®, available from Apple Inc. of Cupertino, Calif.

In the depicted embodiment, the handheld device 30 includes an enclosure 32, which may function to protect the interior components from physical damage and shield them from electromagnetic interference. The enclosure 32 may be formed from any suitable material or combination of materials, such as plastic, metal, or a composite material, and may allow certain frequencies of electromagnetic radiation to pass through to wireless communication circuitry within the handheld device 30 to facilitate wireless communication.

As shown in the present embodiment, the enclosure 32 includes the user input structures 16 through which a user may interface with the device 30. For instance, each input structure 16 may be configured to control one or more respective device functions when pressed or actuated. By way of example, in a cellular phone implementation, one or more of the input structures 16 may be configured to invoke a "home" screen or menu to be displayed, to toggle between a sleep, wake, or powered on/off mode, to silence a ringer for a cellular phone application, to increase or decrease a volume output, and so forth. It should be understood that the illustrated input structures 16 are merely exemplary, and that the handheld electronic device 30 may include any number of suitable user input structures existing in various forms including buttons, switches, control pads, keys, knobs, scroll wheels, and so forth, depending on specific implementation goals and/or requirements.

In the illustrated embodiment, the handheld device 30 includes the above-discussed display 12 in the form of a liquid crystal display (LCD) 34. The LCD 34 may display various images generated by the handheld device 30. For example, the LCD 34 may display various system indicators 36 that provide feedback to a user with regard to one or more states of the handheld device 30, such as power status, signal strength, call status, external device connections, and so forth.

The LCD 34 may also be configured to display a graphical user interface ("GUI") 38 that allows a user to interact with the handheld device 30. The GUI 38 may include various layers, windows, screens, templates, or other graphical elements that may be displayed in all, or a portion, of the LCD 34. Generally, the GUI 38 may include graphical elements that represent applications and functions of the electronic device. The graphical elements may include icons 40 and other images representing buttons, sliders, menu bars, and the like. The icons 40 may correspond to various applications of the electronic device that may open or execute upon detecting a user selection of a respective icon 40. In some embodiments, the selection of an icon 40 may lead to a hierarchical navigation process, such that selection of an icon 40 leads to a screen that includes one or more additional icons or other GUI elements. As will be appreciated, the icons 40 may be selected via a touchscreen included in the display 12, or may be selected by a user input structure 16, such as a wheel or button.

The handheld electronic device 30 additionally includes various input and output (I/O) ports 14 that allow connection of the handheld device 30 to one or more external devices. For example, one I/O port 14 may be a port that allows the transmission and reception of data or commands between the handheld electronic device 30 and another electronic device, such as a computer system. In some embodiments, certain I/O ports 14 may be have dual functions depending, for example, on the external component being coupled to the handheld device 30 via the I/O port 14. For instance, in addition to providing for the transmission of reception of data when connected to another electronic device, certain I/O ports 14 may also charge a battery (power source 28) of the handheld device 30 when coupled to a power adaptor configured to draw/provide power from an external power source, such as an electrical wall outlet. Such an I/O port 14 may be a proprietary port from Apple Inc. or may be an open standard I/O port, such as a universal serial bus (USB) port.

In addition to handheld devices 30, such as the depicted cellular telephone of FIG. 2, an electronic device 10, in accordance with embodiments of the present invention, may also take the form of a computer or other type of electronic device. For instance, such computers may include computers that are generally portable (such as laptop, notebook, and tablet computers) as well as computers that are generally non-portable (such as conventional desktop computers, workstations and/or servers). In certain embodiments, the electronic device 10 in the form of a computer may be a model of a MacBook®, MacBook® Pro, MacBook Air®, iMac®, Mac® mini, or PowerBook® available from Apple Inc. By way of example, an electronic device 10 in the form of a laptop computer 50 is illustrated in FIG. 3 in accordance with one embodiment of the present invention. The depicted computer 50 includes a housing 52, the display 12 (such as the depicted LCD 34 of FIG. 2), the input structures 16, and the I/O ports 14.

In one embodiment, the input structures 16 may include a keyboard, a touchpad, as well as various other buttons and/or switches which may be used to interact with the computer 50, such as to power on or start the computer, to operate a GUI or an application running on the computer 50, as well as adjust various other aspects relating to operation of the computer 50 (e.g., sound volume, display brightness, etc.). For example, a keyboard and/or a touchpad may allow a user to navigate a user interface (e.g., GUI) or an application interface displayed on the LCD 34.

As shown in the present figure, the electronic device 10 in the form of the computer 50 may also include various I/O ports 14 that provide for connectivity to additional devices. For instance, the computer 50 may include an I/O port 14, such as a USB port, a FireWire® (IEEE 1394) port, a high definition multimedia interface (HDMI) port, or any other type of port that is suitable for connecting to an external device, such as another computer or handheld device, a projector, a supplemental display, an external storage device, or so forth. Additionally, the computer 50 may include network connectivity (e.g., network device 26), memory (e.g., memory 20), and storage capabilities (e.g., storage device 22), as described above with respect to FIG. 1. Thus, the computer 50 may store and execute a GUI and various other applications.

With the foregoing discussion in mind, it may be appreciated that an electronic device 10 in either the form of a handheld device 30 (FIG. 2) or a computer 50 (FIG. 3) may be provided with a display device 10 in the form of an LCD 34. As discussed above, an LCD 34 may be utilized for displayed respective operating system and/or application graphical user interfaces running on the electronic device 10 and/or for displaying various data files, including textual, image, video data, or any other type of visual output data that may be associated with the operation of the electronic device 10.

In embodiments in which the electronic device 10 includes an LCD 34, the LCD 34 may typically include an array or matrix of picture elements (i.e., pixels). In operation, the LCD 34 generally operates to modulate the transmittance of light through each pixel by controlling the orientation of liquid crystal disposed at each pixel such that the amount of emitted or reflected light emitted by each pixel is controlled. In general, the orientation of the liquid crystals is controlled by a varying electric field associated with each respective pixel, with the liquid crystals being oriented at any given instant by the properties (e.g., strength, shape, and so forth) of the applied electric field.

As can be appreciated, different types of LCDs may employ different techniques for manipulating these electrical fields and/or the liquid crystals. For example, certain LCDs may employ transverse electric field modes in which the liquid crystals are oriented by applying an in-plane electrical field to a layer of the liquid crystals. Example of such techniques include in-plane switching (IPS) and fringe field switching (FFS) techniques, which differ in the type of electrode arrangement employed to generate the respective electrical fields.

While control of the orientation of the liquid crystals in such displays may be sufficient to modulate the amount of light emitted by a pixel, color filters may also be associated with each pixel within the LCD 34 to allow specific colors of light to be emitted by each pixel. For example, in embodiments where the LCD 34 is a color display, each pixel of a group of pixels may correspond to a different primary color. For example, in one embodiment, a group of pixels may include a red pixel, a green pixel, and a blue pixel, each associated with an appropriately colored filter element. The intensity of light allowed to pass through each pixel (e.g., by modulation of the corresponding liquid crystals), and its combination with the light emitted from other adjacent pixels, determines what color or colors are perceived by a user viewing the display. As the viewable colors are formed from individual color components (e.g., red, green, and blue) provided by the one or a combination of colored pixels, each of the colored pixels themselves may also be referred to herein as "pixels" or "unit pixels" or the like.

With the foregoing in mind, and referring once again to the figures, FIG. 4 depicts an exploded view showing different layers that may be implemented in a unit pixel of an LCD 34. The pixel, referred to herein by the reference number 60, includes an upper polarizing layer 62 and a lower polarizing layer 64 that polarize light emitted by a light source 66, which may be provided as a backlight assembly unit or a light-reflective surface. In embodiments where the light source 66 is a backlight assembly unit, any type of suitable lighting device, such as cold cathode fluorescent lamps (CCFLs), hot cathode fluorescent lamps (HCFLs), and/or light emitting diodes (LEDs), may be utilize to provide lighting.

As shown in the present embodiment, a lower substrate 68 is disposed above the lower polarizing layer 64. The lower substrate 68 is generally formed from a light-transparent material, such as glass, quartz, and/or plastic. A thin film transistor (TFT) layer 70 is depicted as being disposed above the lower substrate 68. For simplicity of illustration, the TFT layer 70 is depicted as a generalized structure in FIG. 4. In practice, the TFT layer 70 may itself include various conductive, non-conductive, and semiconductive layers and structures which generally form the electrical devices and pathways which drive operation of the unit pixel 60. For example, in an embodiment in which the pixel 60 is part of an FFS LCD panel, the TFT layer 70 may include the respective data lines (also referred to as "source lines"), scanning lines (also referred to as "gate lines"), pixel electrodes, and common electrodes (as well as other conductive traces and structures) of the pixel 60. Such conductive structures may, in light-transmissive portions of the pixel 60, be formed using transparent conductive materials, such as indium tin oxide (ITO) or indium zinc oxide (IZO). The TFT layer 70 may further include insulating layers (such as a gate insulating film) formed from suitable transparent materials (such as silicon oxide) and semiconductive layers formed from suitable semiconductor materials (such as amorphous silicon). In general, the respective conductive structures and traces, insulating structures, and semiconductor structures may be suitably disposed to form the respective pixel electrodes and common electrodes, a TFT, and the respective data and scanning lines used to operate the unit pixel 60, as described in further detail below with regard to FIG. 5. In the depicted embodiment, a lower alignment layer 71, which may be formed from polyimide or other suitable materials, may be disposed between the TFT layer 70 and a liquid crystal layer 72.

The liquid crystal layer 72 may include liquid crystal molecules suspended in a fluid or embedded in polymer networks. The liquid crystal molecules may be oriented or aligned with respect to an electrical field generated by the TFT layer 70. In practice, the orientation of the liquid crystal molecules in the liquid crystal layer 72 determines the amount of light (e.g., provided by the light source 66) that is transmitted through the pixel 60. Thus, by modulation of the electrical field applied to the liquid crystal layer 72, the amount of light transmitted though the pixel 60 may be correspondingly modulated.

Disposed on the side of the liquid crystal layer 72 opposite from the TFT layer 70 may be one or more upper alignment and/or overcoating layers 74 interfacing between the liquid crystal layer 72 and an overlying color filter 76. The color filter 76, in certain embodiments, may be a red, green, or blue filter, such that each unit pixel 60 of the LCD 34 corresponds to a primary color when light is transmitted from the light source 66 through the liquid crystal layer 72 and the color filter 76.

The color filter 76 may be surrounded by a light-opaque mask or matrix 78, commonly referred to as a "black mask," which circumscribes the light-transmissive portion of the unit pixel 60. For example, in certain embodiments, the black mask 78 may be sized and shaped to define a light-transmissive aperture over the liquid crystal layer 72 and around the color filter 76 and to cover or mask portions of the unit pixel 60 that do not transmit light, such as the scanning line and data line driving circuitry, the TFT, and the periphery of the pixel 60. Further, in addition to defining the light-transmissive aperture, the black mask 78 may serve to prevent light transmitted through the aperture and color filter 76 from diffusing or "bleeding" into adjacent unit pixels.

In the depicted embodiment, an upper substrate 80 may be further disposed between the color filter 76 (including the black mask 78) and the upper polarizing layer 64. In such an embodiment, the upper substrate may be formed from light-transmissive glass, quartz, and/or plastic.

Figure 5:
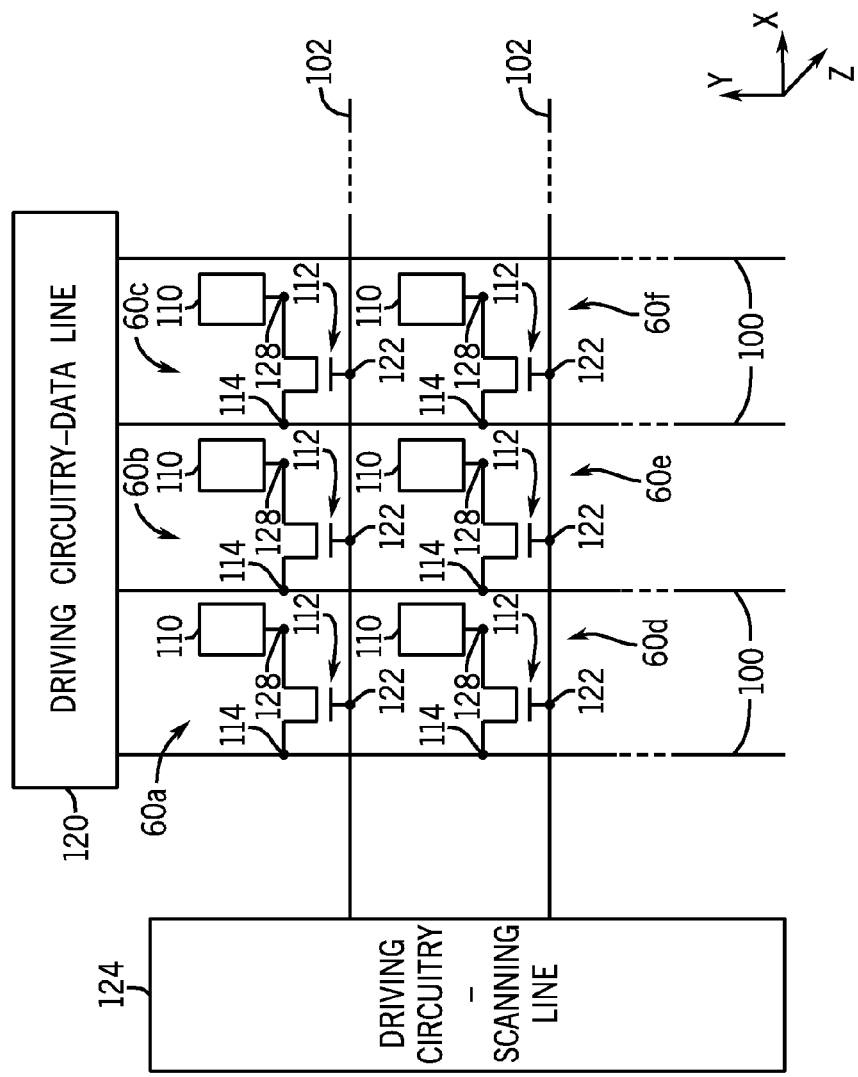
FIG. 5 is a circuit diagram showing switching and display circuitry that may be used in conjunction with an LCD display panel, in accordance with aspects of the present disclosure.

Continuing now to FIG. 5, a schematic circuit representation of pixel driving circuitry found in an LCD 34 is shown. For example, such circuitry as depicted in FIG. 5 may be embodied in the TFT layer 70 described above with respect to FIG. 4. As depicted, a plurality of unit pixels 60, each of which may be formed in accordance with the unit pixel 60 shown in FIG. 4, may be disposed in a pixel array or matrix defining a plurality of rows and columns of unit pixels that collectively form an image display region of an LCD 34. In such an array, each unit pixel 60 may be defined by the intersection of rows and columns, which may be defined by the illustrated data (or "source") lines 100 and scanning (or "gate") lines 102, respectively.

Although only six unit pixels, referred to individually by the reference numbers 60a-60f, respectively, are shown in the present example for purposes of simplicity, it should be understood that in an actual LCD implementation, each data line 100 and scanning line 102 may include hundreds or even thousands of unit pixels. By way of example, in a color LCD panel 34 having a display resolution of 1024×768, each data line 100, which may define a column of the pixel array, may include 768 unit pixels, while each scanning line 102, which may define a row of the pixel array, may include 1024 groups of pixels, wherein each group has a red, blue, and green pixel, thus totaling 3072 unit pixels per scanning line 102. In the present illustration, the group of unit pixels 60a-60c may represent a group of pixels having a red pixel (60a), a blue pixel (60b), and a green pixel (60c). The group of unit pixels 60d-60f may be arranged in a similar manner.

As shown in the present figure, each unit pixel 60 includes a pixel electrode 110 and thin film transistor (TFT) 112 for switching the pixel electrode 110. In the depicted embodiment, the source 114 of each TFT 112 is electrically connected to a data line 100, extending from respective data line driving circuitry 120. Similarly, in the depicted embodiment, the gate 122 of each TFT 112 is electrically connected to a scanning or gate line 102, extending from respective scanning line driving circuitry 124. In the depicted embodiment, the pixel electrode 110 is electrically connected to a drain 128 of the respective TFT 112.

In one embodiment, the data line driving circuitry 120 may send image signals to the pixels 60 by way of the respective data lines 100. Such image signals may be applied by line-sequence. That is, the data lines 100 (defining columns) may be sequentially activated during operation of the LCD 34. The scanning lines 102 (defining rows) may apply scanning signals from the scanning line driving circuitry 124 to the respective gates 122 of each TFT 112 to which the respective scanning lines 102 are connected. Such scanning signals may be applied by line-sequence with a predetermined timing and/or in a pulsed manner.

Each TFT 112 serves as a switching element which may be activated and deactivated (e.g., turned on and off) for a predetermined period based upon the respective presence or absence of a scanning signal at the gate 122 of the TFT 112. When activated, a TFT 112 may store the image signals received via a respective data line 100 as a charge in the pixel electrode 110 with a predetermined timing. The image signals stored by the pixel electrode 110 may be used to generate an electrical field between the respective pixel electrode 110 and a common electrode (not shown in FIG. 5). Such an electrical field may align liquid crystals molecules within the liquid crystal layer 72 (FIG. 4) to modulate light transmission through the liquid crystal layer 72. In some embodiments, a storage capacitor (not shown) may also be provided in parallel to the liquid crystal capacitor formed between the pixel electrode 110 and the common electrode to prevent leakage of the stored image signal by the pixel electrode 110. For example, such a storage capacitor may be provided between the drain 128 of the respective TFT 112 and a separate capacitor line.

Figure 6:
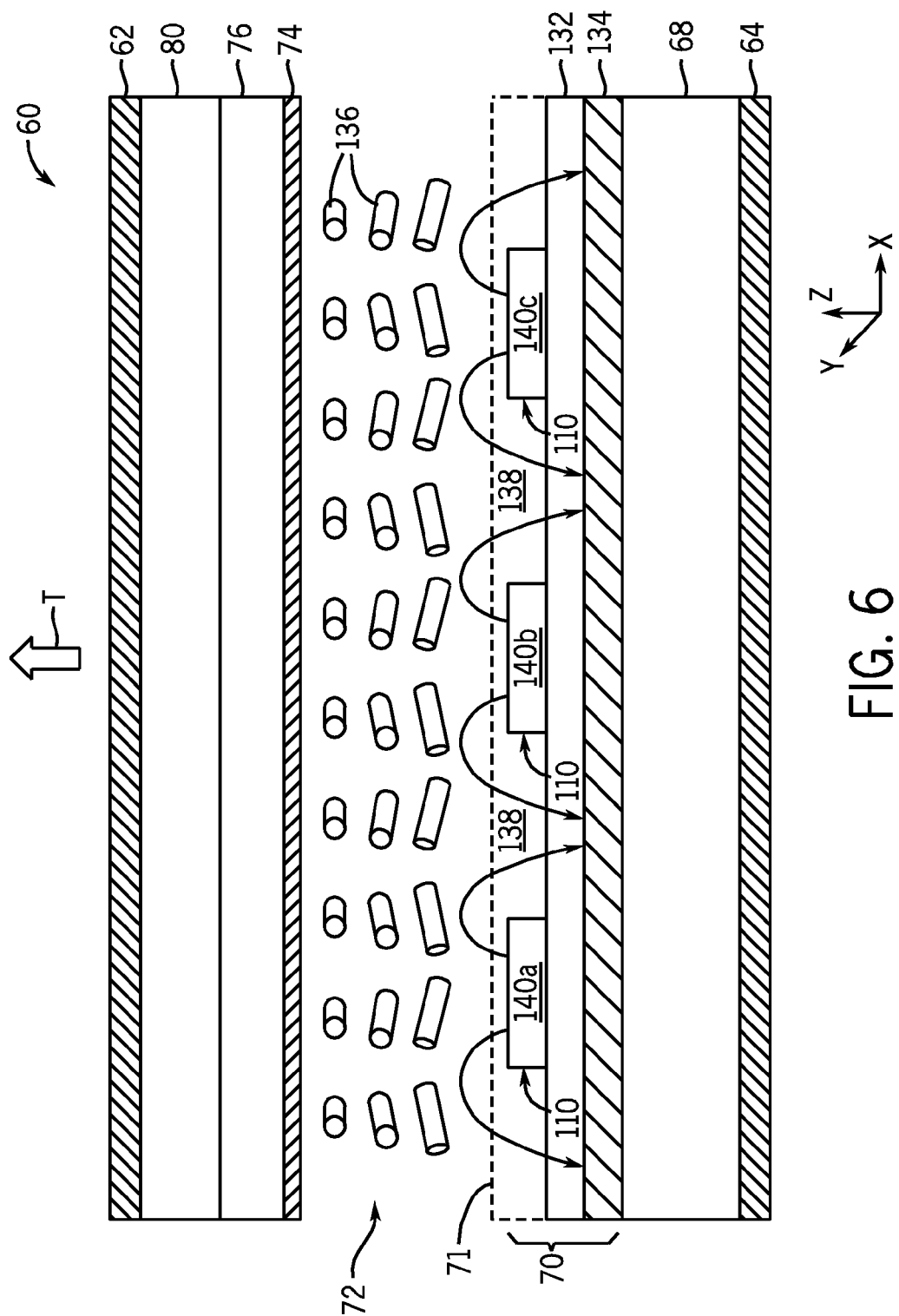
FIG. 6 is a cutaway cross-sectional side view of a unit pixel of an LCD display panel, in accordance with aspects of the present disclosure.

The operation of the unit pixel 60 and, particularly, the arrangement of the pixel electrodes 110 and the common electrodes discussed in FIG. 5 may be better understood with respect to FIG. 6, which illustrates the operation of the unit pixel 60 via a cutaway cross-sectional side view. As shown, the view of the unit pixel 60 in FIG. 6 includes the layers generally described above with reference to FIG. 4, including the upper polarizing layer 62, lower polarizing layer 64, lower substrate 68, TFT layer 70, liquid crystal layer 72, alignment layers 71 and 74, color filter 76, and upper substrate 80.

As mentioned above, the TFT layer 70, which was depicted as a generalized structure in FIG. 4, may include various conductive, non-conductive, and/or semiconductive layers and structures defining electrical devices and pathways for driving the operation of the pixel 60. In the illustrated embodiment, the TFT layer 70 is shown in the context of a fringe field switching (FFS) LCD display device and includes the pixel electrode 110, an insulating layer 132, and a common electrode layer 134. The common electrode layer 134 is disposed above the lower substrate 68, and the insulation layer 132 is disposed between the pixel electrode 110 and the common electrode 134.

The pixel electrodes 110 and the common electrode layer 134 may be made of a transparent conductive material, such as ITO or IZO, for example. The common electrode layer 134 generally covers the surface of each unit pixel 60, and may be connected to a common line (not shown), which may be parallel to a scanning line 102 to which the illustrated unit pixel 60 is connected. The pixel electrode 110 may be formed as having a plurality of slit-like voids 138, such that the portions of the pixel electrode 110 between each of the slits 138 define one or more electrode "strip-like" or "finger-like" shapes, referred to in FIG. 6 by the reference numbers 140a-140c, that generally lie within a plane of the unit pixel 60 defined by the x-axis and y-axis (x-y plane), as depicted by the reference axes shown in FIG. 6. As shown in the present figure, portions of the lower alignment layer 71 may at least partially protrude into the region defined by the slits 138. In accordance with aspects of the present disclosure, which will be discussed in further detail below with regard to FIGS. 7-11B, the electrode strips 140a-140c of the pixel electrode 110 may be arranged in various multi-domain configurations so as to provide for improved viewing angle and color shift properties, as well as to provide for improved transmittance rates relative to those of conventional multi-domain configurations.

In accordance with FFS LCD operating principles, the liquid crystal molecules 136 within the liquid crystal layer 72 may have a "default" orientation in a first direction based upon the configuration of the lower 71 and upper alignment layers 74. When a voltage is applied to the unit pixel 60, an electrical field is formed between the pixel electrode strips 140a-140c (of the pixel electrode 110) and the common electrode layer 134. As discussed above, the electrical field (referred to herein by the reference label E) controls the orientation of liquid crystal molecules 136 within the liquid crystal layer 72, such that the orientation changes with respect to the default orientation, thereby allowing at least a portion of the light transmitted from the light source 66 (not shown in FIG. 6) to be transmitted through the pixel 60. Thus, by modulating the electrical field E, the light provided by the light source 66 and transmitted through the unit pixel 60, as indicated by the reference label T, may be controlled. In this manner, image data sent along the data lines 100 and scanning lines 102 may be perceived by a user viewing the LCD 34 as an image.

Before continuing, it should be understood that the electrodes 110 (including electrode strips 140a-140c) and electrode layer 134 of the depicted FFS LCD panel may also be implemented in an opposite manner depending on how the FFS LCD panel 34 is constructed. That is, in certain embodiments, the electrodes 110 may function as common electrodes and the electrode layer 134 may function as a pixel electrode. Thus, while the following discussion with respect to FIGS. 7-11B will describe various aspects of the present technique as being implemented with respect to the pixel electrodes of unit pixels, it should be appreciated that the presently described techniques may also be applied where the electrodes 110 function as common electrodes.

As discussed above, certain embodiments of the present disclosure provide for unit pixels 60 having pixel electrodes 110 arranged to provide a multi-domain configuration resulting in improved viewing angle and color shift properties, as well as providing for improved transmittance rates over conventional multi-domain pixel designs. For instance, referring now to FIG. 7, a detailed plan view of a portion of an LCD panel 34 in accordance with a first embodiment of the present disclosure is illustrated. Particularly, the portion of the LCD panel 34 illustrated in FIG. 7 includes the unit pixels 60a-60f discussed above with reference to FIG. 5, as well as the unit pixels 60g and 60h. In the depicted embodiment, two scanning lines 102a and 102b, which are generally parallel to a horizontal axis (x-axis), and three data lines 100a, 100b, and 100c, which are generally parallel to a vertical axis (y-axis) are shown. The unit pixels 60a-60c are each coupled to the scanning line 102a and respective data lines 100a-100c. Similarly, the unit pixels 60d-60f are each coupled to the scanning line 102b and respective data lines 100a-100c. As discussed above, where the LCD 34 is a color display, each group of unit pixels 60a-60c and 60d-60f may represent a group of unit pixels having a red, blue, and green unit pixel. The unit pixels 60g and 60h are also coupled to the scanning lines 102a and 102b, respectively, as well as an additional common data line (not shown).

As mentioned above, each unit pixel 60 is generally defined by the intersection of a data line 100 and a scanning line 102. Particularly, the intersection of a data line 100 and a scanning line 102 defines a TFT 112 which, when switched on, serves to apply a voltage from the data line 100 to liquid crystal molecules 136 (FIG. 6) within a corresponding unit pixel 60 or to remove the applied voltage when switched off.

As shown in the depicted embodiment, the pixel electrodes 110 of each of the illustrated pixels 60a-60h include the electrode strips 140a-140c arranged in an undulating wave-like manner, such that each of the electrode strips 140a-140c oscillates with respect to the vertical axis (y-axis) to form a generally wavy or wave-like shape along the vertical axis of the LCD 34. That is, if the vertical axis were to be aligned directly over an electrode strip (140a-140c), the curve defined by the wavy electrode strip oscillates to periodically traverse both sides of the vertical axis, in a manner similar to a sine wave.

Although the wave-like configuration of the pixel electrode 110 shown in the present embodiment may exhibit electrical fields that differ in direction throughout the unit pixel 60, the changes in the electrical field directions are generally less abrupt and more gradual compared to conventional multi-domain pixel designs. As such, disclinations that may occur within the light-transmissive region of the unit pixel 60 due to interference between electrical fields in different domains may be eliminated or rendered less noticeable. As will be appreciated, such properties may provide for increased transmittance while retaining the viewing angle and color shift properties typical of conventional multi-domain designs.

Additionally, referring to the unit pixels 60g and 60h, a black mask 78 element is illustrated. As discussed above, the black mask 78, which may be formed from a light-opaque material, may define a light-transmissive aperture over the liquid crystal layer 72 for each of the unit pixels, and may cover or mask portions of the unit pixel 60 that do not transmit light, such as the TFT 112 and the scanning/data line circuitry.

Figure 7:
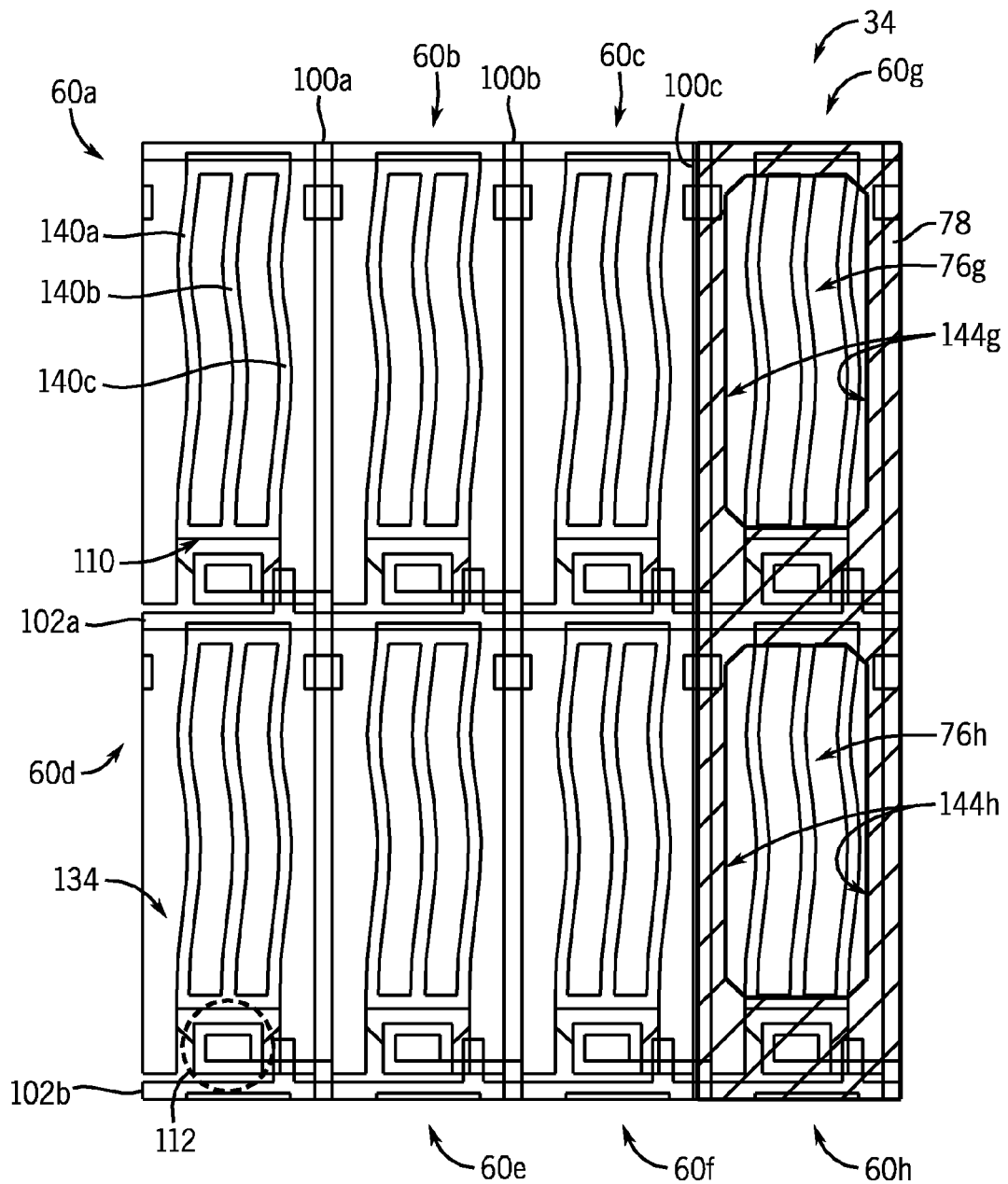
FIG. 7 is a detailed plan view of a portion of an LCD display panel, in accordance with a first embodiment of the present disclosure.

In some embodiments, the black mask 78 may also serve to at least partially mask disclinations that may occur due to interference between electrical fields (E) occurring in multiple domains within a unit pixel. For illustrative purposes, the black mask 78 in FIG. 7 is only shown as covering the unit pixels 60g and 60h. In practice, it should be appreciated that the black mask 78 may form a matrix over all the unit pixels within an LCD 34.

As shown in the present embodiment, the vertical edges 144g and 144h of the apertures corresponding to the unit pixels 60g and 60h, respectively, are substantially parallel with both the y-axis and the data lines 100a-100c. That is, the vertical edges 144g and 144h of the apertures of the embodiment shown in FIG. 7 are substantially linear and parallel to the vertical axis (y-axis) of the LCD panel 34 and, thus, do not mimic the wave-like shape defined by the undulating electrode strips 140a-140c. Also as discussed above, a color filter 76, which may be a red, green, or blue filter, may be provided within each defined aperture such that each unit pixel 60 corresponds to a particular primary color when light is transmitted therethrough. For instance, the color filters 76g and 76h corresponding to the unit pixels 60g and 60h, respectively, may correspond to one of a red, blue or green filter.

Before continuing, it should be noted that each of the wavy electrode strips 140a-140c shown in the present embodiment, are illustrated as being generally uniformly spaced apart from each other and as having a generally constant period of oscillation along the vertical axis. However, it should be understood that in alternate embodiments, both the period of oscillation along the vertical axis and the spacing between each of the electrode strips 140a-140c may vary and/or be non-uniform.

Figure 8:
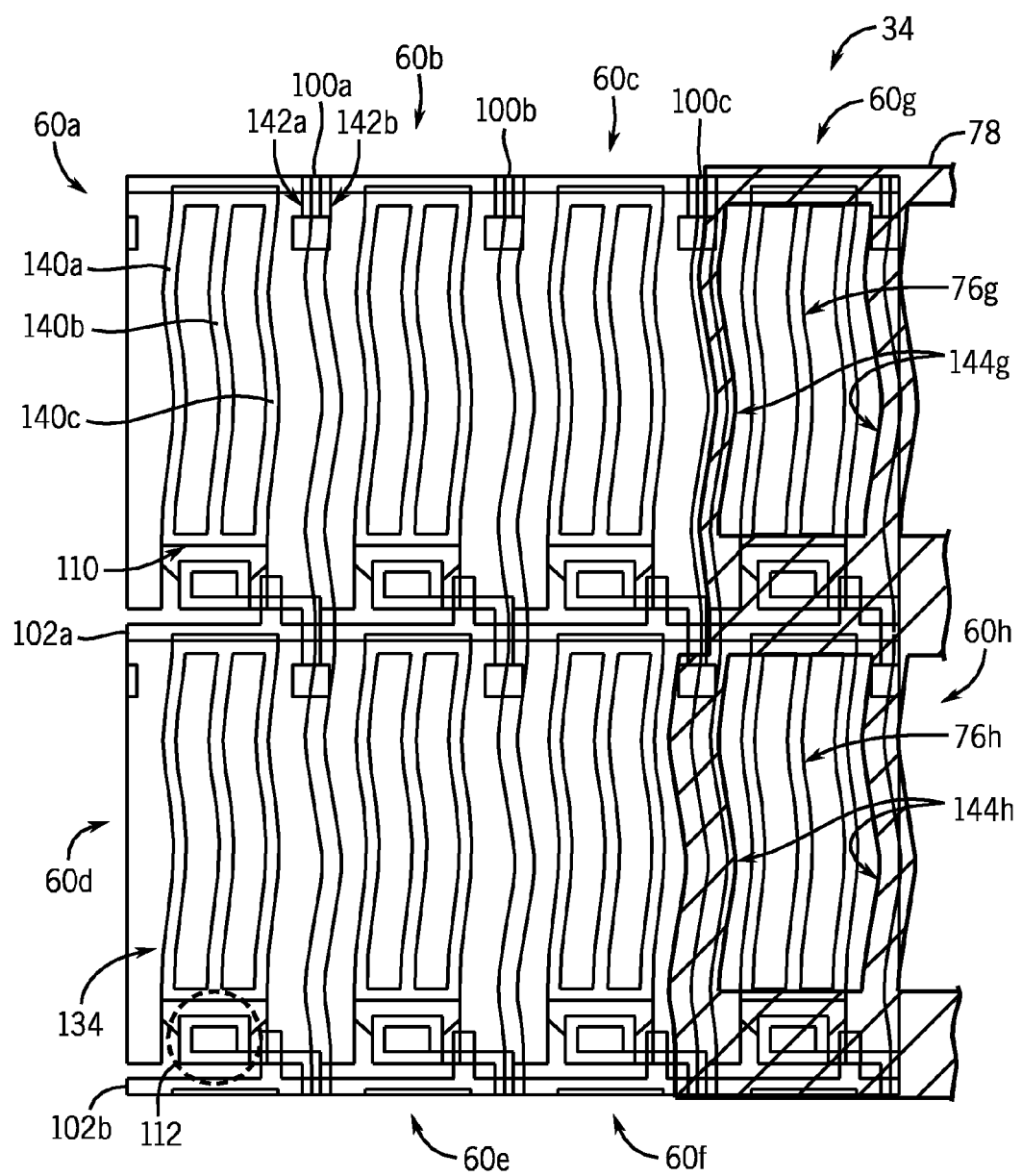
FIG. 8 is a detailed plan view of a portion of an LCD display panel, in accordance with a second embodiment of the present disclosure.

Continuing to FIG. 8, a further embodiment of an LCD panel 34 is illustrated in accordance with aspects of the present disclosure. As shown, the LCD panel 34 of FIG. 8 includes unit pixels 60a-60h having pixel electrodes with electrode strips 140a-140c arranged in an oscillating wave-like manner similar to the embodiment shown in FIG. 7. Further, the data lines 100a-100c in the present embodiment are arranged to have an oscillating wave-like configuration along the vertical axis, such that they are generally mimic the shape of the electrode strips 140a-140c of the unit pixels 60a-60h. That is, the data lines 100a-100c are not linear and parallel to the vertical axis (as was shown in FIG. 7), but instead generally follows the curve defined by the wave-shaped electrode strips 140a-140c, such that both vertical edges 142a and 142b of the data lines (e.g., 100a) mimic the wave-like shape of the electrodes strips 140a-140c in a parallel manner. As used herein, the phrase "mimic in a generally parallel manner" or the like shall be understood to refer to an arrangement in which two structures (e.g., the electrode strip 140c and the data line 100a) have substantially identically shaped edges and are arranged in a generally parallel manner such that corresponding points along the edges of each structure are generally equidistant. For instance, as shown in the present figure, the data line 100a has a wave-like shape that mimics the undulating electrode strip 140c of the unit pixel 60a, such that the edge 142a of the data line 100a is substantially equidistant from the electrode strip 140c at all points along the vertical length of the unit pixel 60a.

The present embodiment also provides for a black mask element 78 that defines apertures 76g and 76h which have vertical edges 144g and 144h, respectively, that also mimic the wave-like shape of the electrode strips 140a-140c in a generally parallel manner similar to the arrangement of the data lines 100a-100c (as opposed to being parallel to the vertical axis as shown in FIG. 7). As will be appreciated, an LCD panel 34 utilizing wave-like electrode strips 140a-140c in conjunction with the generally parallel wave-like data line 100a-100c and apertures having generally parallel wave-like vertical edges (144g and 144h), as shown in FIG. 8, may provide for a higher transmittance rate relative to the embodiment shown in FIG. 7.

Figure 9A:
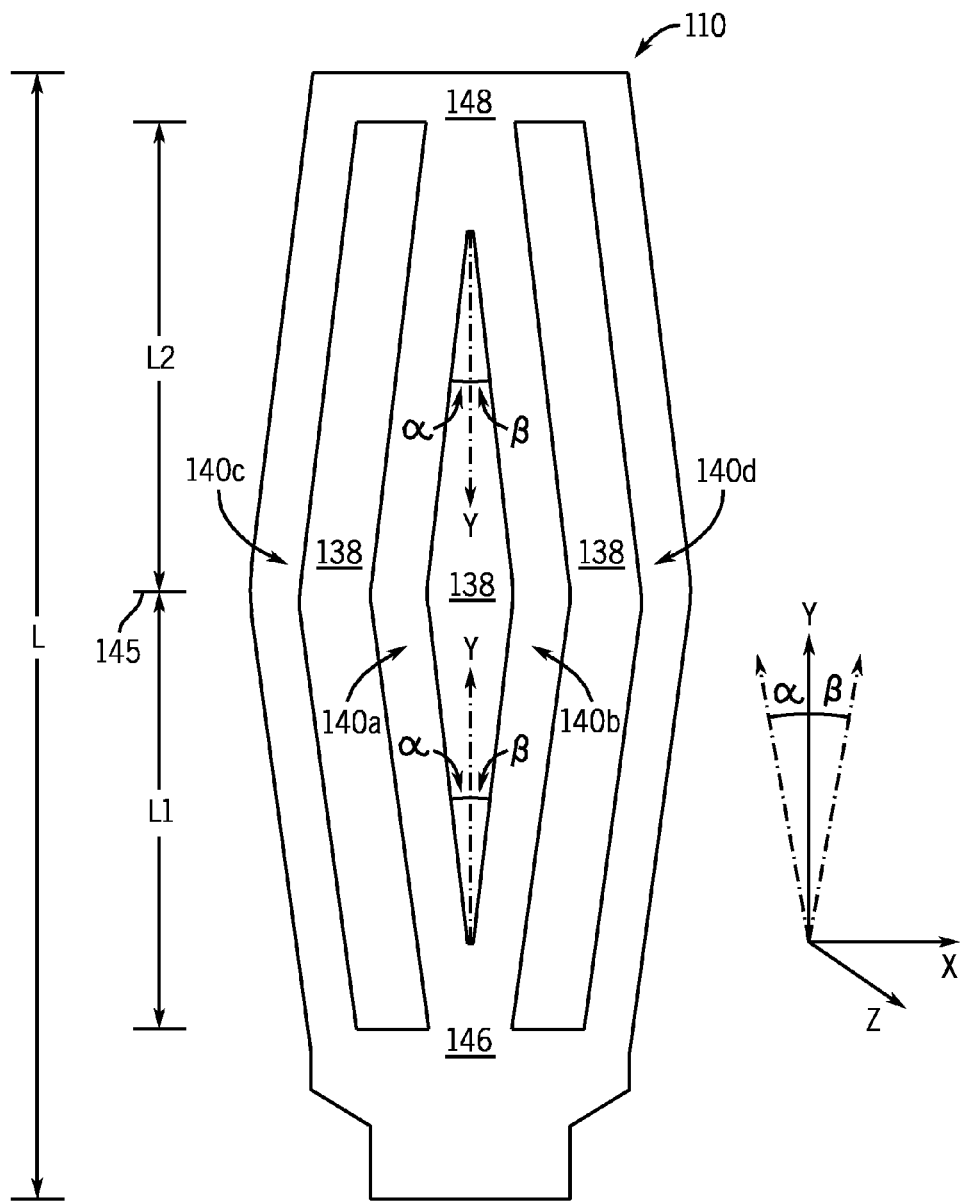
FIG. 9A is a simplified plan view of an electrode arrangement corresponding to a unit pixel, in accordance with a third embodiment of the present disclosure.

Referring now to FIG. 9A, a further embodiment of a pixel electrode 110 configuration is depicted by way of a simplified plan view. As shown, the pixel electrode 110 includes the electrodes 140a-140d defined by the slits 138. The pixel electrode 110 may have a length L along the vertical axis (y-axis of the illustrated reference axes) generally defined by first and second opposing ends, referred to by the reference numbers 146 and 148, respectively, between which the electrode strips 140a-140d diverge and converge with respect to the vertical axis. For instance, the electrode strips 140a and 140b may extend from the first end 146 of the electrode 110 and diverge with respect to the vertical axis by the angles α and β, respectively, along a first length L1 of the electrode 110. Though shown as being generally equal in magnitude, it should be appreciated that the angles α and β may have different magnitudes in other embodiments.

As shown in the present embodiment, the electrode strips 140a and 140b may diverge by the angles α and β generally along vertical length L of the electrode until an intermediate point, depicted here as the end of the first length L1 referred to by the reference number 145. From the intermediate point 145, the electrode strips 140a and 140b may begin to converge via the angles α and β, respectively, along a second length L2 of electrode 110, such that the electrode strips 140a and 140b eventually meet and adjoin at the second end 148 of the pixel electrode 110. In the illustrated embodiment, the lengths L1 and L2 are shown as being generally equal, though it should be understood that the lengths L1 and L2 may not be equal in alternate embodiments. In such embodiments, the angles at which the electrode strips 140a and 140b converge (along L2) may not be equal in magnitude to the angles α and β. For instance, if L2 is greater than L1, the angles at which each of the electrode strips 140a and 140b converge may be lesser in magnitude relative to the angles α and β, respectively. Similarly, if L2 is less than L1, the angles at which each of the electrode strips 140a and 140b converge may be greater in magnitude relative to the angles α and β, respectively.

The pixel electrode 110 in the present embodiment also includes the electrode strips 140c and 140d which are adjacent to the electrode strips 140a and 140b, respectively. The electrode strips 140c and 140d generally mimic the diverging/converging shape defined by the electrode strips 140a and 140b, respectively, in a parallel manner along the lengths L1 and L2. That is, the electrode strips 140c and 140d may diverge from the first end 146 of the pixel electrode 110 at the angles α and β, respectively, along the length L1, and converge at the second end 148 along the length L2 in a manner similar to the electrode strips 140a and 140b.

Figure 9B:
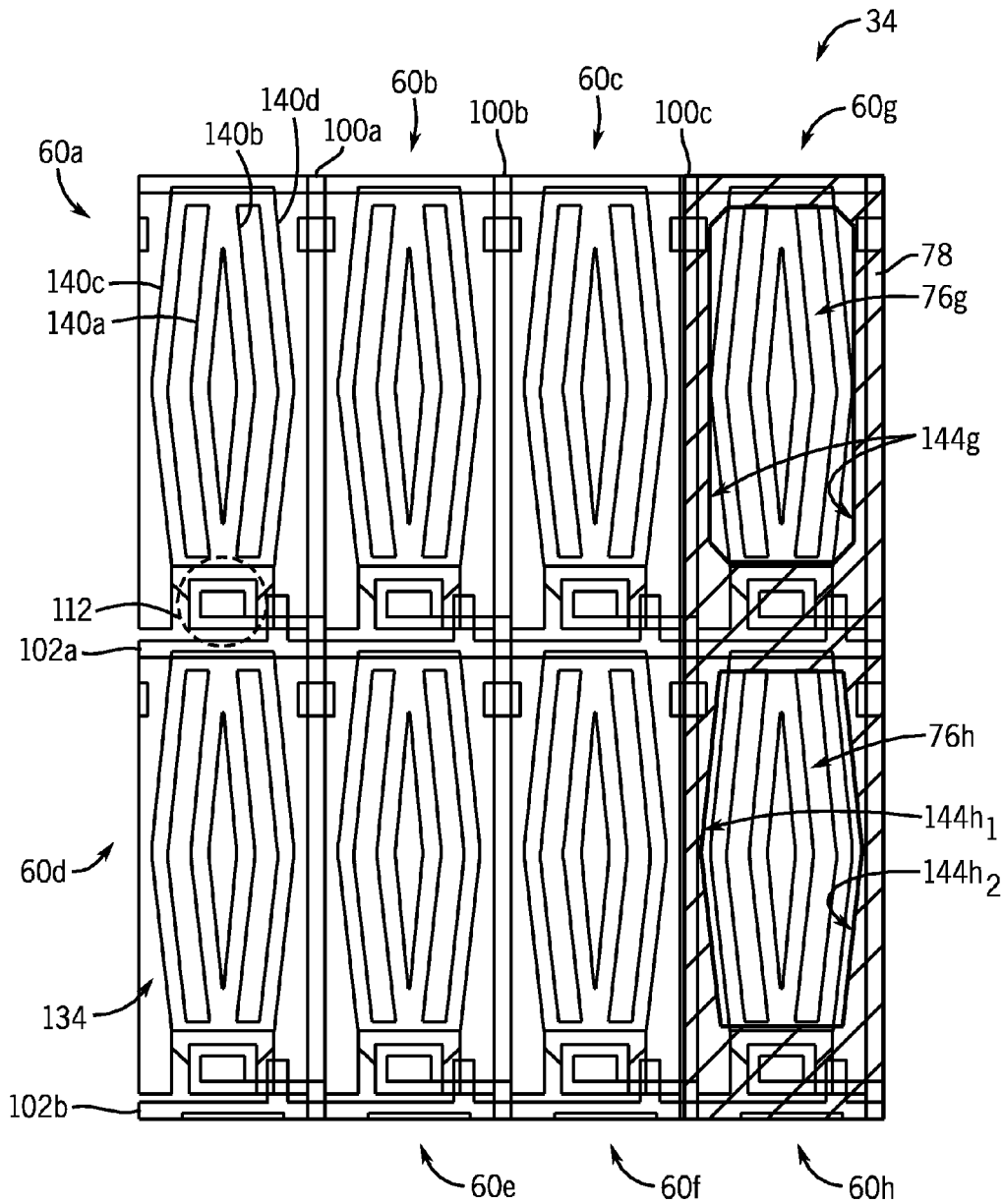
FIG. 9B is a detailed plan view of a portion of an LCD display panel utilizing an electrode arrangement in accordance with the embodiment depicted in FIG. 9A.

Referring now to FIG. 9B, a detailed plan view of an LCD panel 34 having unit pixels 60a-60h utilizing the pixel electrode configuration shown in FIG. 9A is illustrated. As shown, the LCD 34 of FIG. 9B includes the scanning lines 102a and 102b, which are generally parallel to a horizontal axis (x-axis), and data lines 100a, 100b, and 100c, which are generally parallel to a vertical axis (y-axis). As discussed above, the unit pixels 60a-60c are each coupled to the scanning line 102a and respective data lines 100a-100c, and may define a group of unit pixels having a red, blue, and green unit pixel. Similarly, the unit pixels 60d-60f, which may also define a red, blue, and green pixel group, are coupled to the adjacent scanning line 102b and respective data lines 100a-100c.

The LCD panel 34 of FIG. 9B may also include the black mask 78 discussed above, which may define light-transmissive apertures, as shown over the unit pixels 60g and 60h. A light-transmissive aperture may have vertical edges 144g generally parallel to the vertical axis and the data lines 100a-100c, as shown with respect to the unit pixel 60g and discussed above with reference to FIG. 7. Alternatively, the light-transmissive apertures defined by the black mask 78 may include vertical edges that are not parallel (e.g., not linear) to the vertical axis, but instead mimic the shape of the diverging/converging electrode arrangement shown in FIG. 9A in a parallel manner. For instance, referring to the unit pixel 60h, a first vertical edge $144h_1$ that mimics the diverging/converging shape of the electrode strips 140a and 140c in a substantially parallel manner may be formed on a first side of the aperture, and a second vertical edge $144h_2$ that mimics the diverging/converging shape of the electrode strips 140b and 140d in a substantially parallel manner may be formed on a second side of the aperture (opposite the first side). As will be appreciated, an LCD panel 34 utilizing the pixel electrode configuration of FIG. 9A and a black mask 78 defining apertures having vertical edges similar to the edges $144h_1$ and $144h_2$ may provide for a higher transmittance rate compared to a similar LCD panel 34 utilizing apertures having vertical edges (e.g., 144g) parallel to the vertical axis.

Figure 10A:
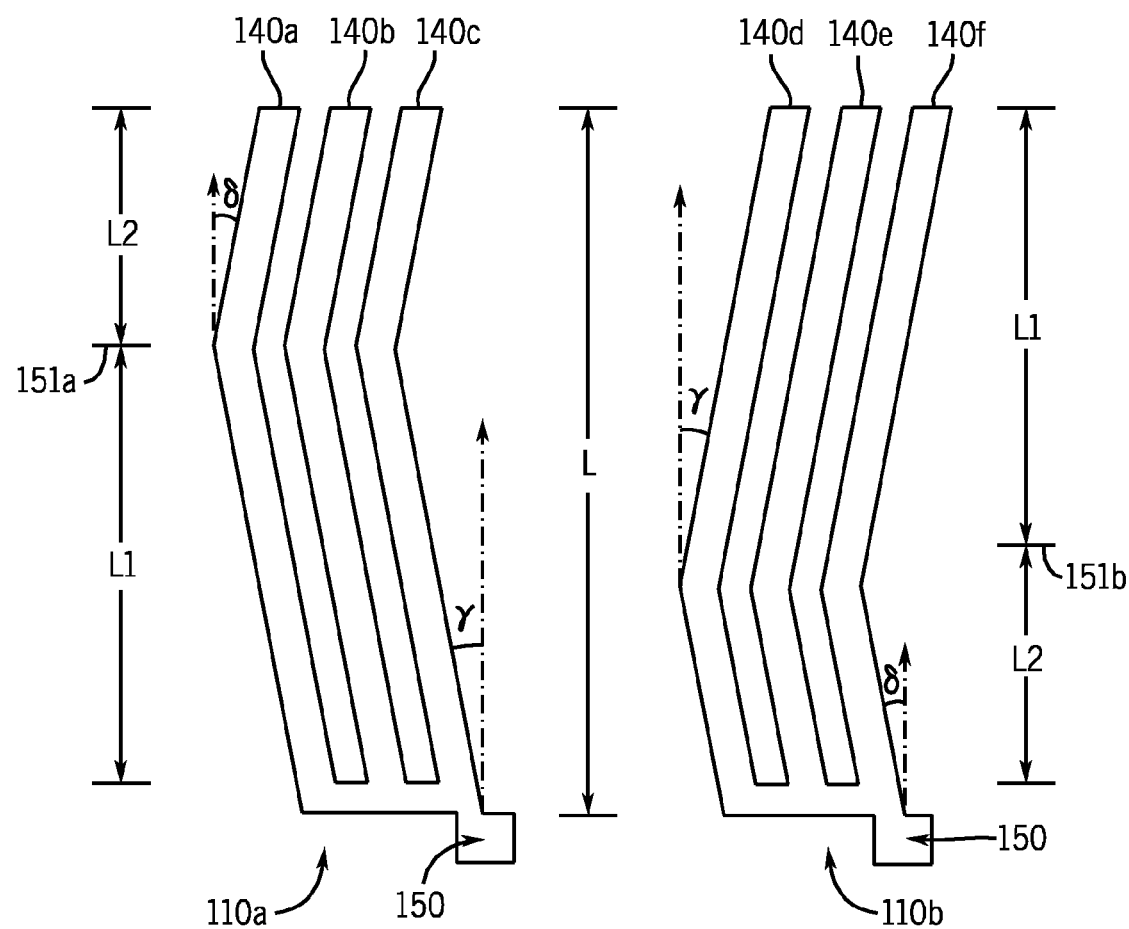
FIG. 10A is a simplified plan view of electrode arrangements corresponding to two adjacent unit pixels, in accordance with a fourth embodiment of the present disclosure.

Continuing now to FIG. 10A, simplified plan views depicting pixel electrode configurations 110a and 110b, which may correspond to adjacent unit pixels, are illustrated in accordance with a further embodiment of the present disclosure. In the present embodiment, each of the pixel electrodes 110a and 110b may be arranged in a multiple-domain configuration as having electrode strips that are angled such that the pixel electrodes 110a and 110b are asymmetric with respect to both the horizontal axis (x-axis) and the vertical axis (y-axis). For instance, the pixel electrode 110a, which may have a vertical length L, may include the electrode strips 140a-140c extending along the length L from a first end ("transistor end") of the electrode 110a having an electrode portion 150 adapted to couple to the TFT 112. As shown, the electrode strips 140a-140c may be generally parallel to each other, and may extend along a first length L1 of the pixel electrode 110a at an angle having a magnitude γ with respect to the vertical axis in a first angular direction (e.g., negative direction with respect to the x-axis) until the intermediate point labeled by the reference number 151a. At the intermediate point 151a, the electrode strips 140a-140c may continue along the length L2 in a second angular direction opposite the first angular direction (e.g., positive direction with respect to the x-axis) at an angle having a magnitude δ with respect to the vertical axis, wherein the length L2 is less than the length L1, thus providing for the asymmetric configuration. In the present embodiment, the angles γ and δ may be generally equal in magnitude, though it should be appreciated that in other embodiments, the angles γ and δ may have different magnitudes.

Additionally, the pixel electrode 110b is shown in the present figure as having an arrangement similar to the pixel electrode 110a, but in a complementary manner. For instance, the pixel electrode 110b may include the electrode strips 140d-140f that extend from the transistor end 150 of the electrode 110b along the length L2 in the first angular direction at an angle having a magnitude δ with respect to the vertical axis. Upon reaching an intermediate point 151b, the electrode strips 140d-140f may continue along the length L1 in the second angular direction at an angle having a magnitude γ with respect to the vertical axis.

Figure 10B:
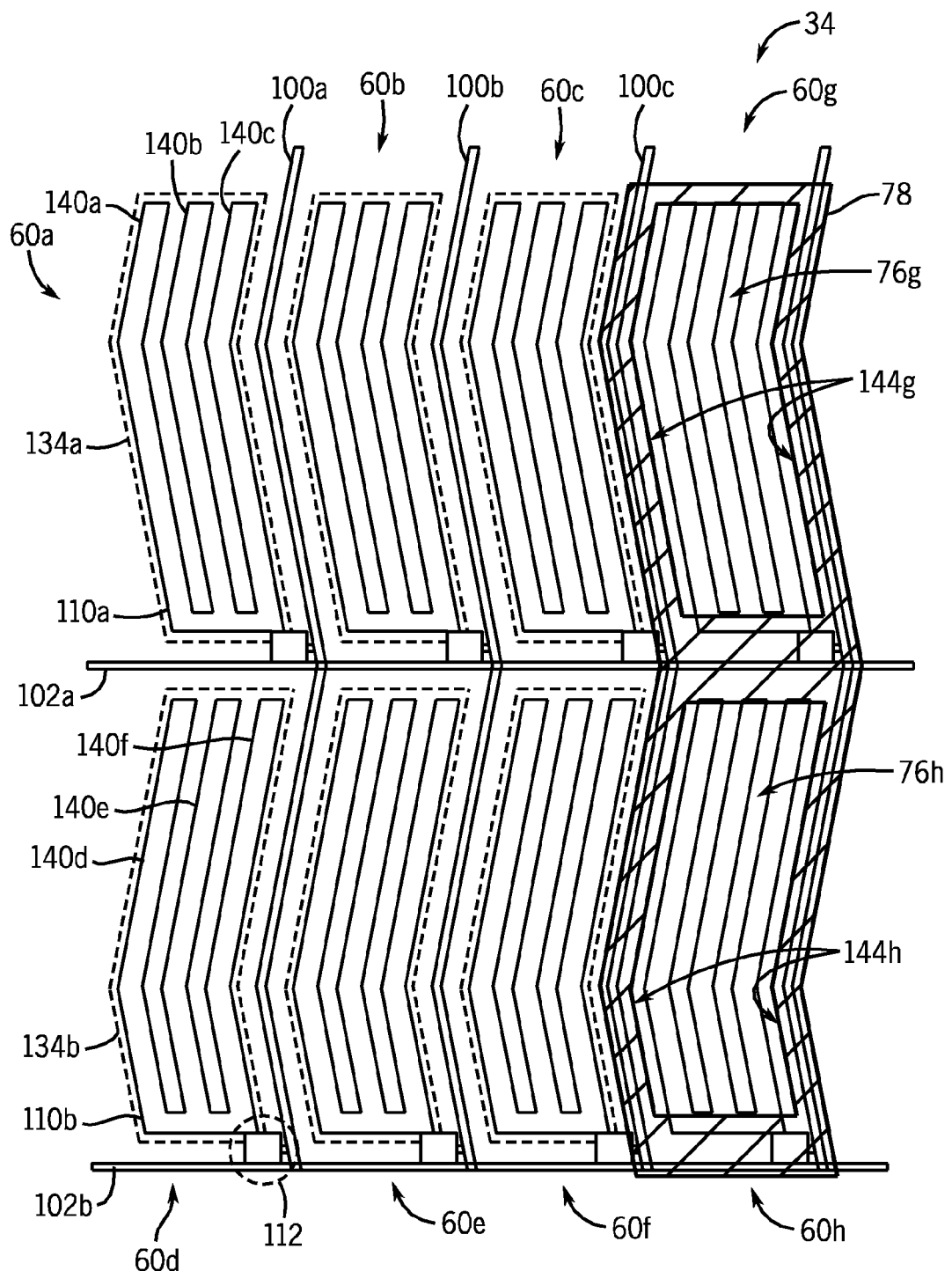
FIG. 10B is a detailed plan view of a portion of an LCD display panel utilizing electrode arrangements in accordance with the embodiment depicted in FIG. 10A.

The presently illustrated pixel electrode configurations 110a and 110b of FIG. 10A may be implemented in an LCD panel 34 in an alternating manner such that every other row (defined by scanning lines 102) includes unit pixels having the pixel electrode configuration 110a and such that every other complementary row includes unit pixels having the pixel electrode configuration 110b. For instance, such an embodiment is illustrated in further detail with respect to FIG. 10B. As shown in FIG. 10B, the unit pixels 60a-60c, which are each coupled to the scanning line 102a and respective data lines 100a-100c, may define a row of unit pixels each including the pixel electrode configuration 110a having the electrode strips 140a-140c arranged in the manner described in FIG. 10A. The unit pixels 60d-60f, which are each coupled to the scanning line 102b and respective data lines 100a-100c, may similarly define an adjacent row or unit pixels each including the pixel electrode configuration 110b having the electrode strips 140d-140f.

The data lines 100a-100c may be oriented such that the portions of each data line (100a-100c) between adjacent scanning lines mimic the shape defined by pixel electrode strips of directly adjacent unit pixels in a substantially parallel manner. For instance, the portion of the data line 100a between the scanning lines 102a and 102b generally mimics the shape of the electrode strips 140d-140f (of unit pixel 60d), and the portion of the data line 100a between the scanning line 102a and a directly adjacent scanning line (not shown) on the side opposite the scanning line 102b generally mimics the shape of the electrode strips 140a-140c (of unit pixel 60a). In this manner, the data lines 100a-100c may each define a generally zigzag shape that mimics the shape of adjacent electrode strips (140a-140f) in a parallel manner along the vertical length of the LCD panel 34.

Additionally, the unit pixels 60a-60h shown in FIG. 10B may each include a common electrode layer 134 that generally conforms with the shape defined by the respective pixel electrode arrangement (110a or 110b) for each unit pixel 60a-60h. For example, the unit pixels 60a-60c, each of which includes the pixel electrode 110a, may further include the common electrode layer, shown by the reference number 134a. Similarly, the unit pixels 60d-60f, which each include the pixel electrode 110b, may each include the common electrode layer 134b. Again, it should also be noted that the unit pixels 60a-60c and the unit pixels 60d-60f may each define a groups of three unit pixels having a red, blue, and green unit pixel.

The LCD panel 34 of FIG. 10B further illustrates an embodiment of the black mask 78 element that may be used in conjunction with the unit pixels 60a-60h having the pixel electrode configurations 110a and 110b. The illustrated black mask 78 may define light-transmissive apertures over each unit pixel of a LCD panel 34, such that each aperture has vertical edges (with respect to the y-axis) that generally mimics the shape of corresponding electrodes strips (either 140a-140c or 140d-140f) in a substantially parallel manner within a respective unit pixel. For instance, the aperture shown over the unit pixel 60g, which is coupled to the scanning line 102a, may include the vertical edges 144g that generally mimic the shape of the electrode strips 140a-140c of the pixel electrode 110a in a substantially parallel manner, such that the vertical edges 144g are generally equidistance from each of the electrode strips 140a-140c of the unit pixel 60g at each point along the vertical length of the electrode strips 140a-140c that are exposed via the aperture. Similarly, the aperture shown over the unit pixel 60h, which is coupled to the scanning line 102b, may include the vertical edges 144h, which are generally mimic the shape of the electrode strips 140d-140f of the pixel electrode 110b in a substantially parallel manner.

As discussed above, the pixel electrodes 110a and 110b may, individually, be asymmetric with respect to the vertical and horizontal axes. When arranged in an alternating manner by scanning lines, as shown in FIG. 10B, the electrode strips 140a-140c of the pixel electrodes 110a may generally be symmetrical to the electrode strips 140d-140f of the pixel electrodes 110b about a horizontal axis defined by the scanning line 102a. Similarly, the common electrode layers 134a (corresponding to the unit pixels 60a-60c) and 134b (corresponding to the unit pixels 60d-60f), as well as the apertures over the unit pixels 60g and 60h (defined by the black mask 78), in the presently illustrated arrangement, may also be generally symmetrical about the scanning line 102a. As will be appreciated, an LCD panel 34 utilizing a pixel array having the pixel electrode configurations 110a and 110b and respective apertures defined by vertical edges 144g and 144h, respectively, as shown in FIG. 10B, may provide for improved transmittance rates and/or reduced off-axis color shift compared to that conventional multi-domain designs.

Figure 11A:
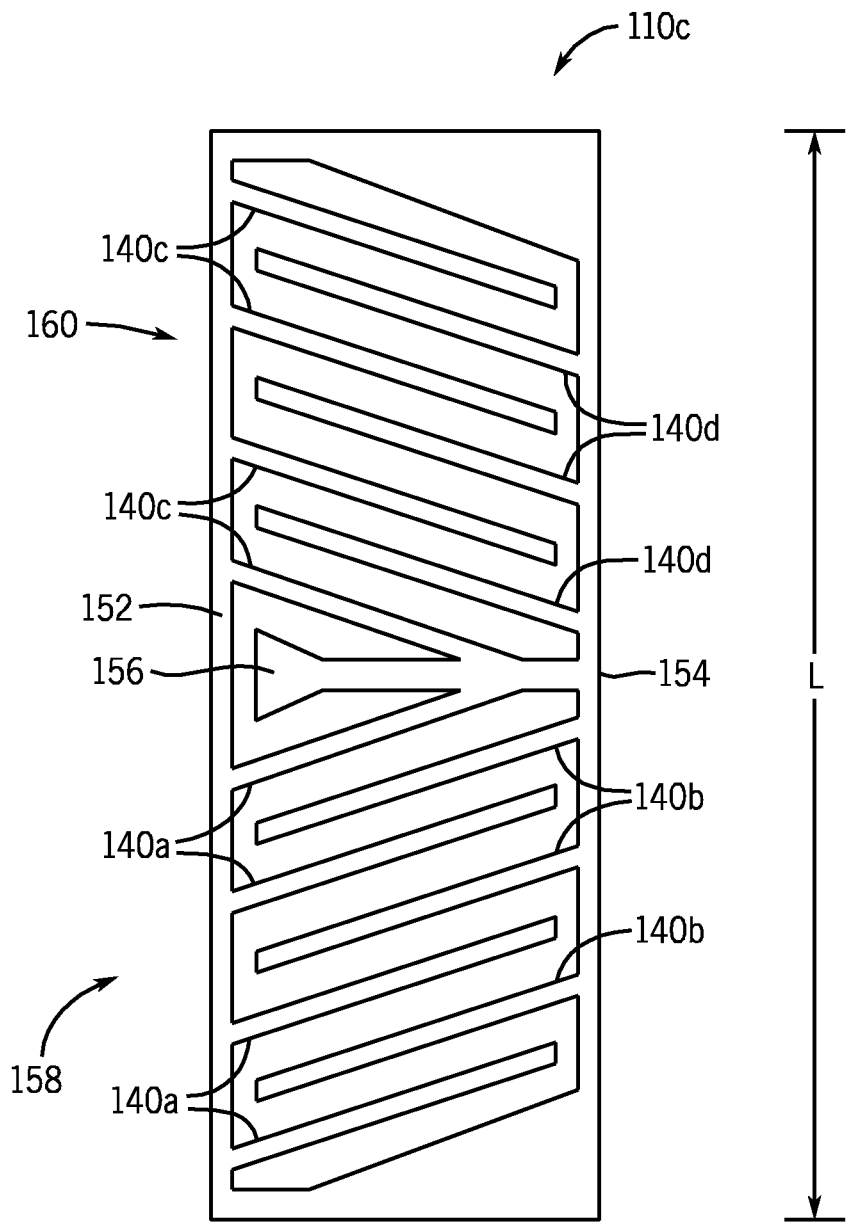
FIG. 11A is a simplified plan view of an electrode arrangement corresponding to a unit pixel, in accordance with a fifth embodiment of the present disclosure.
Figure 11B:
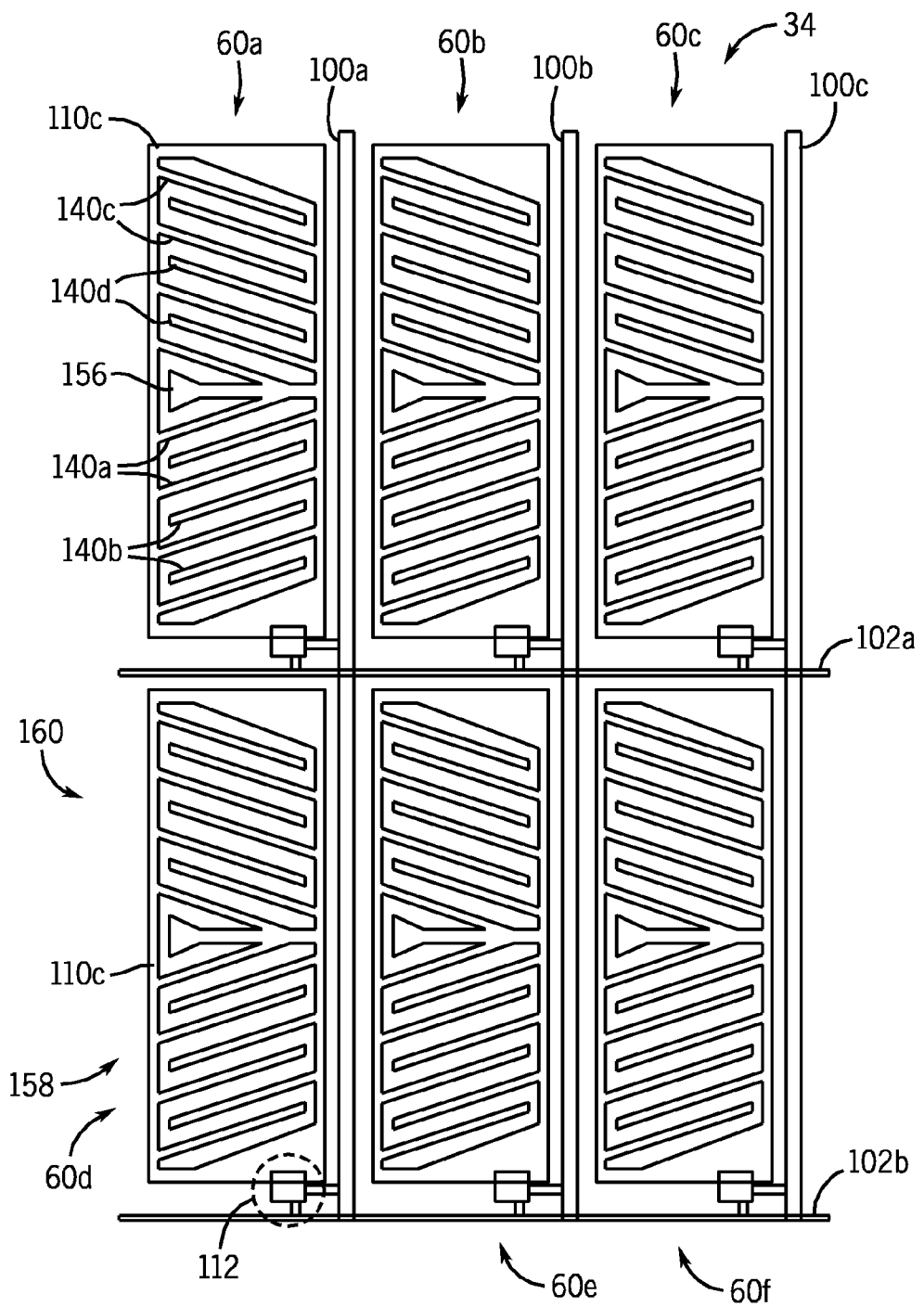
FIG. 11B is a detailed plan view of a portion of an LCD display panel utilizing an electrode arrangement in accordance with the embodiment depicted in FIG. 11A.

Continuing now to FIGS. 11A and 11B, a further embodiment of a LCD panel 34 is illustrated. Referring first to FIG. 11A, a simplified plan view of a pixel electrode, referred to by the reference number 110c, is shown in accordance with aspects of the present disclosure. The electrode 110c may include vertical edge portions 152 and 154 which extend along the vertical length L (with respect to the y-axis) on opposite sides of the electrode 110c. The electrode 110c additionally includes a dividing electrode portion 156, which may define a lower and upper portion of the pixel electrode 110c, referred to here by the reference numbers 158 and 160, respectively. In the presently illustrated embodiment, the dividing electrode portion 156 extends from a single vertical edge portion (here 154), and may be disposed generally at the midpoint of the length L, such that that vertical length of the lower portion 158 is generally equivalent to the vertical length of the upper portion 160. It should be appreciated, however, that in other embodiments, the dividing electrode portion 156 may extend from the opposing vertical edge (e.g., 152) or from both vertical edges (e.g., 152 and 154), and/or may define lower 158 and upper portions 160 that differ in vertical length.

Each of the lower portion 158 and the upper portion 160 of the electrode 110c may include interleaving sets of electrode strips extending from each of the vertical edge portions 152 and 154. For instance, the lower portion 158 may include a first set of electrode strips 140a extending from the vertical edge 152, and a second set of electrode strips 140b extending from the opposing vertical edge 154, such that the electrode strips 140a and 140b are generally parallel to each other and form an interleaving arrangement. In the present embodiment, the electrode strips 140a and 140b may extend from their respective vertical edges 152 and 154 at an angle with respect to the horizontal axis (x-axis), but in opposite angular directions. For example, the electrode strips 140a may extend from the vertical edge 152 at an angle having a magnitude ϵ with respect to the horizontal axis and in a first angular direction (e.g., positive direction with respect to the y-axis). The electrode strips 140b may extend from the opposing vertical edge 154 at an angle having the magnitude ϵ with respect to the horizontal axis, but in a second angular direction opposite the first angular direction (e.g., negative direction with respect to the y-axis).

Referring to the upper portion 160, a similar interleaving arrangement may be formed by the electrode strips 140c extending from the vertical edge 152 and the electrode strips 140d extending from the opposing vertical edge 154. As shown, the electrode strips 140c and 140d are generally parallel to each other, but not parallel to the electrode strips 140a and 140b of the lower portion 158. In the present embodiment, each of the electrode strip sets 140c and 140d extend from their respective vertical edges 152 and 154 at an angle having the magnitude ϵ, but in angular directions opposite from the electrode strip sets 140a and 140b, respectively. For instance, the electrode strips 140c may extend from the edge 152 to form an angle with respect to the horizontal axis in the second angular direction (e.g., negative with respect to the y-axis, as defined above), whereas the electrode strips 140d may extend from the edge 154 to form an angle with respect to the horizontal axis, but in the first angular direction (e.g., positive with respect to the y-axis, as defined above). Additionally, while each of the electrode strip sets 140a, 140b, 140c, and 140d are illustrated in FIG. 11A as generally having equivalent lengths and spaced uniformly apart from each other, it should be understood that in further embodiments, the electrodes 140a, 140b, 140c, and 140d may have differing lengths and/or may be spaced non-uniformly with respect to each other.

An LCD panel 34 having unit pixels utilizing the pixel electrode configuration 110c is illustrated in FIG. 11B by way of a detailed plan view. As shown, the illustrated portion of the LCD panel 34 in FIG. 11B includes the unit pixels 60a-60c coupled to the scanning line 102a and respective data lines 100a-100c, as well as the unit pixels 60d-60f coupled to the adjacent scanning line 102b and respective data lines 100a-100c. Here again, it should be understood that the unit pixels 60a-60c and 60d-60f may respectively define groups of three unit pixels having a red, blue, and green unit pixel.

As depicted, each of the unit pixels 60a-60f within the pixel array shown in FIG. 11B may include a pixel electrode 110c having the electrode strip sets 140a-140d extending from opposing vertical edges 152 and 154 in the manner discussed above with reference FIG. 11A. Though not shown in the present figure, in practice, the LCD panel 34 of FIG. 11B may include a black mask 78 similar to the embodiment shown in FIG. 7, which may define light-transmissive apertures over each of the unit pixels 60a-60f. As will be appreciated, an LCD panel 34 utilizing the pixel electrodes 110c shown here may have an increased aperture ratio relative to conventional multi-domain pixel designs, thus providing for an improved transmittance rate which may result in enhanced brightness when perceived by a user viewing the LCD panel 34.

The presently disclosed techniques, which have been explained by way of the various exemplary embodiments described above, may be utilized in a variety of LCD devices, particularly fringe field switching (FFS) LCD devices. When compared to conventional multi-domain pixel designs, the embodiments described above may offer improvements with regard to one or more LCD display panel properties, such as viewing angle, color shift, and/or transmittance rates. Additionally, those skilled in the art will appreciate that the LCD panels incorporating one or more of the foregoing techniques may be manufactured using any type of suitable layer deposition process, such as chemical vapor deposition (CVD or PECVD).

While the present invention may be susceptible to various modifications and alternative forms, specific embodiments have been shown by way of example in the drawings and will be described in detail herein. However, it should be understood that the techniques set forth in the present disclosure are not intended to be limited to the particular forms disclosed. Rather, the invention is to cover all modifications, equivalents and alternatives falling within the spirit and scope of the disclosure as defined by the following appended claims.

What is claimed is:

1. A liquid crystal display (LCD) panel, comprising:
   a pixel array comprising a plurality of unit pixels, wherein each of the plurality of unit pixels comprises an electrode having one or more undulating electrode strips, wherein each of the one or more undulating electrode strips defines a generally wave-like shape along a vertical axis of the LCD panel, and has substantially one and a half periods of oscillation; and
   a light-opaque mask disposed over the pixel array and defining a light-transmissive aperture over each of the unit pixels, wherein the vertical edges of each of the apertures generally mimics the wave-like shape of the one or more undulating electrode strips of a corresponding unit pixel, wherein the aperture and the one or more undulating electrode strips are substantially in phase with one another.

2. The LCD panel of claim 1, wherein the each of the one or more curvilinear electrode strips has a substantially constant period of oscillation with respect to the vertical axis.

3. The LCD panel of claim 1, wherein each of the one or more curvilinear electrode strips has a varying period of oscillation with respect to the vertical axis.

4. The LCD panel of claim 1, wherein the one or more curvilinear electrode strips corresponding to the electrode of a unit pixel comprises a plurality of curvilinear electrodes strips arranged in a generally parallel manner, each of the curvilinear electrodes strips having the generally wave-like shape.

5. The LCD panel of claim 4, wherein the plurality of curvilinear electrode strips are spaced apart within the unit pixel in a substantially uniform manner.

6. The LCD panel of claim 4, wherein the plurality of curvilinear electrode strips are spaced apart within the unit pixel in a non-uniform manner.

7. The LCD panel of claim 1, wherein the pixel array comprises a plurality of scanning lines and data lines defining rows and columns, respectively, wherein each row is defined by a plurality of unit pixels coupled to a common scanning line, and wherein each column is defined by a plurality of unit pixels coupled to a common data line.

8. The LCD panel of claim 7, wherein each data line generally mimics the wave-like shape of the one or more curvilinear electrode strips of the unit pixels coupled thereto in a parallel manner along the vertical axis of the LCD panel.

9. The LCD panel of claim 1, wherein the LCD panel comprises a fringe field switching LCD panel.

10. The LCD panel of claim 1, wherein the electrode comprises one or more of indium tin oxide (ITO) or indium zinc oxide (IZO).

11. A liquid crystal display (LCD) panel, comprising:
   a pixel array comprising a plurality of unit pixels arranged in rows and columns along respective scanning lines and data lines, wherein each of the unit pixels comprises an electrode having first and second opposing vertical edges extending along a vertical axis of the LCD panel, wherein the electrode comprises:
   a first set of electrode strips extending from the first vertical edge to the second vertical edge in a serpentine manner;
   a second set of electrode strips extending from the first vertical edge to the second vertical edge in a serpentine manner; and
   a dividing electrode portion coupled to one or both of the first and second vertical edges, wherein the dividing electrode portion is distinct from the first and second electrode strips and physically separates the electrode into lower and upper portions with respect to the vertical axis.

12. The LCD panel of claim 11, wherein the first set of electrode strips extends from the first vertical edge at an angle with respect to a horizontal axis of the LCD panel in a first angular direction along the vertical axis, and wherein the second set of electrode strips extends from the first vertical edge at the angle, but in a second angular direction along the vertical axis, the second angular direction being opposite the first angular direction.

13. The LCD panel of claim 11, wherein the first and second sets of electrode strips extend from portions of the first and second vertical edges, respectively, in the upper and lower portions of the electrode.

14. The LCD panel of claim 11, wherein the electrode comprises a top end portion and a bottom end portion coupled to the one or more curvilinear electrode strips.

15. The LCD panel of claim 11, wherein each of the plurality of unit pixels comprises a thin film transistor (TFT) coupling the respective pixel to a respective scanning line and a data line.

16. The LCD panel of claim 11, wherein the upper portion and the lower portion are generally symmetrical about the dividing portion.

17. The LCD panel of claim 11, comprising:
a third set of electrode strips that extends from the second vertical edge generally parallel to the first set of electrode strips, wherein the third set of electrode strips is interleaved with the first set of electrode strips; and
a fourth set of electrode strips that extends from the second vertical edge generally parallel to the second set of electrode strips, wherein the fourth set of electrode strips is interleaved with the second set of electrode strips.

18. The LCD panel of claim 11, wherein the LCD panel is formed using chemical vapor deposition.

19. The LCD panel of claim 11, wherein the first and second electrode strips comprise indium tin oxide (ITO), indium zinc oxide (IZO), or a combination thereof.

20. The LCD panel of claim 1, comprising a light-opaque matrix disposed over the pixel array and defining a light-transmissive aperture over each of the unit pixels, wherein each light-transmissive aperture comprises a first parallel edge and a second parallel edge that each generally mimic the shape the generally wave-like shape of the one or more undulating electrode shapes in a generally parallel manner.

* * * * *